(12) United States Patent
Boddeti et al.

(10) Patent No.: US 12,149,708 B2
(45) Date of Patent: Nov. 19, 2024

(54) MACHINE LEARNING OF ENCODING PARAMETERS FOR A NETWORK USING A VIDEO ENCODER

(71) Applicant: NVIDIA Corporation, Santa Clara, CA (US)

(72) Inventors: Ravi Kumar Boddeti, Hyderabad (IN); Vinayak Pore, Pune (IN); Hassane Samir Azar, Los Altos, CA (US); Prashant Sohani, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 7 days.

(21) Appl. No.: 17/402,953

(22) Filed: Aug. 16, 2021

(65) Prior Publication Data

US 2023/0048189 A1 Feb. 16, 2023

(51) Int. Cl.
| | |
|---|---|
| *H04N 19/00* | (2014.01) |
| *G06N 20/00* | (2019.01) |
| *H04N 19/127* | (2014.01) |
| *H04N 19/142* | (2014.01) |
| *H04N 19/166* | (2014.01) |
| *H04N 19/65* | (2014.01) |

(52) U.S. Cl.
CPC .......... *H04N 19/166* (2014.11); *G06N 20/00* (2019.01); *H04N 19/127* (2014.11); *H04N 19/142* (2014.11); *H04N 19/65* (2014.11)

(58) Field of Classification Search
None
See application file for complete search history.

(56) References Cited

U.S. PATENT DOCUMENTS

| 10,230,405 B2 | 3/2019 | Lin et al. | |
|---|---|---|---|
| 11,671,604 B1 * | 6/2023 | Khsib | H04N 19/179 |
| | | | 375/240.03 |
| 2020/0099733 A1 * | 3/2020 | Chu | H04N 21/8456 |

(Continued)

OTHER PUBLICATIONS

"dacast.com", https://www.dacast.com/blog/adaptive-bitrate-streaming/, 18 pages, Sep. 27, 2021.

(Continued)

*Primary Examiner* — Samuel D Fereja
(74) *Attorney, Agent, or Firm* — Taylor English Duma L.L.P.

(57) ABSTRACT

In various examples, machine learning of encoding parameter values for a network is performed using a video encoder. Feedback associated with streaming video encoded by a video encoder over a network may be applied to an MLM(s). Using such feedback, the MLM(s) may predict a value(s) of an encoding parameter(s). The video encoder may then use the value to encode subsequent video data for the streaming. By using the video encoder in training, the MLM(s) may learn based on actual encoded parameter values of the video encoder. The MLM(s) may be trained via reinforcement learning based on video encoded by the video encoder. A rewards metric(s) may be used to train the MLM(s) using data generated or applied to the physical network in which the MLM(s) is to be deployed and/or a simulation thereof. Penalty metric(s) (e.g., the quantity of dropped frames) may also be used to train the MLM(s).

20 Claims, 11 Drawing Sheets

(56) References Cited

U.S. PATENT DOCUMENTS

| | | | |
|---|---|---|---|
| 2020/0344472 A1* | 10/2020 | Peng | H04N 19/184 |
| 2021/0012227 A1* | 1/2021 | Fang | H04L 41/065 |
| 2021/0092493 A1* | 3/2021 | Codenie | H04H 60/372 |
| 2021/0203951 A1* | 7/2021 | Kottke | H04N 19/179 |

OTHER PUBLICATIONS

"dacast.com", https://web.archive.org/web/20200926180327/https://www.dacast.com/blog/adaptive-bitrate-streaming/, 14 Pages , Aug. 4, 2020.

Hongzi Mao, Ravi Netravali, Mohammad Alizadeh; Neural Adaptive Video Streaming with Pensieve; SIGCOMM '17, Aug. 21-25, 2017, Los Angeles, CA, USA.

Viswanath Sivakumar; Open-sourcing mvfst-rl, a research platform for managing network congestion with reinforcement learning; Facebook Artificial Intelligence; Oct. 14, 2019.

Viswanath Sivakumar, Tim Rocktäschel, Alexander H. Miller, Heinrich Küttler, Nantas Nardelli, Mike Rabbat, Joelle Pineau, and Sebastian Riedel; MVFST-RL: An Asynchronous RL Framework for Congestion Control with Delayed Actions: arXiv:1910.04054v3; Oct. 30, 2019.

* cited by examiner

MACHINE LEARNING OF ENCODING PARAMETERS FOR A NETWORK USING A VIDEO ENCODER

BACKGROUND

An increasing amount of content is being transmitted over digital networks using video streaming technologies. This content not only includes television and movie content, but also gaming, video monitoring, and other types of content. A video encoder may be employed to encode video data (also referred to herein as "video content") for streaming the video content over a network. The video encoder may have various settings for encoding parameters, which impacts the encoding process and the Quality of Service (QoS) of the stream. Various encoding parameters may correspond to one or more of the following: encoding quality, video resolution, frame rate, audio and/or image bitrate, encoding mode, pixel aspect ratio, error correction, and more. The encoding parameters used to encode video are particularly critical when streaming gaming content, as issues with latency or frame stuttering can impact gameplay and overall user experience.

A conventional approach to setting encoding parameters includes testing a client's network speed and configuring various settings that impact the bitrate of the encoded video accordingly. However, the bitrate of the encoded video can vary greatly depending on, for example, the video content that is encoded. This can result in a significant mismatch between the optimal bitrate for the stream and the encoded bitrate that is achieved by the encoder. As such, the encoding parameters may be set too conservatively at the expense of video quality or packet losses, and frame drops may frequently occur at the client side. Additionally, QoS may vary for different networks, as network speed may not be sufficient to account for differences between networks when determining encoding parameters.

SUMMARY

Embodiments of the present disclosure relate to machine learning of encoding parameter values for a network using a video encoder. Systems and methods are disclosed that may be used to train a machine learning model (MLM) to predict encoding parameter values that a video encoder may use to produce encoded video that accounts for video content and network characteristics, which may result in improved streaming performance.

In contrast to conventional approaches, disclosed approaches may apply feedback associated with streaming video encoded by a video encoder over a network, to an MLM(s). For example, such feedback may include (without limitation), data such as quantity of frames dropped, bandwidth availability, or encoded bitrate of the stream. Using such feedback as input, the MLM(s) may predict a value(s) of an encoding parameter(s). For example, if the number of frames dropped is over a threshold count as indicated in the feedback, disclosed approaches predict that the bitrate value should decrease. The video encoder may then use the value of the encoding parameter to encode subsequent video data for the streaming. In some disclosed approaches, such predictions may be based on training the MLM(s) via reinforcement learning based on video encoded by the video encoder. A rewards metric(s) (e.g., for maximizing bitrate) may be used to train the MLM(s) using data generated or applied to the physical network in which the MLM(s) is to be deployed and/or a simulation thereof. Penalty metric(s) (e.g., the quantity of dropped frames) may also be used to train the MLM(s). By using the video encoder in training, the MLM(s) may learn based on actual encoded parameter values of the video encoder.

BRIEF DESCRIPTION OF THE DRAWINGS

The present systems and methods for machine learning of encoding parameter values for a network using a video encoder is described in detail below with reference to the attached drawing figures, wherein.

DETAILED DESCRIPTION

Figure 1:
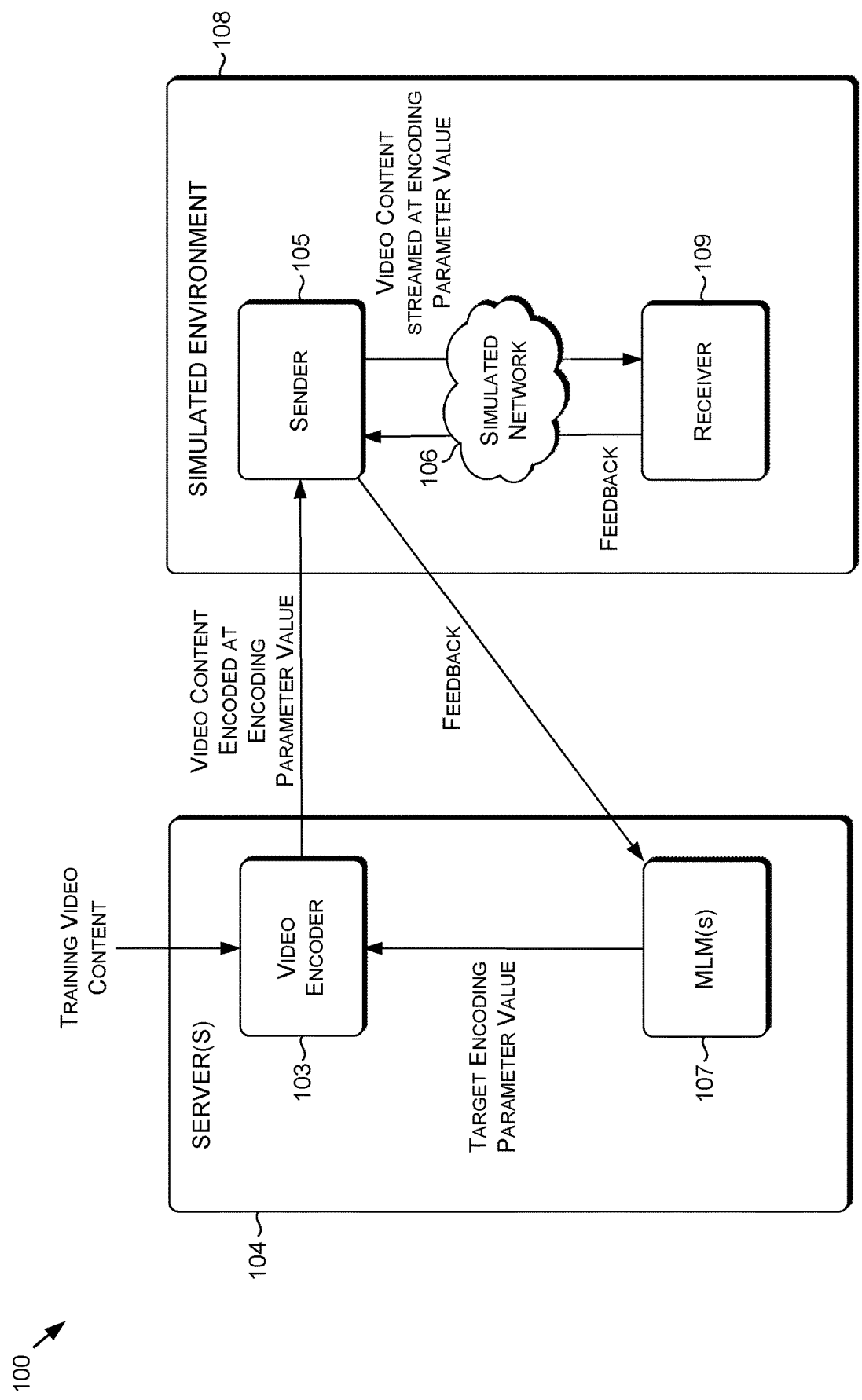
FIG. 1 is a block diagram of an example training system, in accordance with one or more embodiments of the present disclosure.

Systems and methods are disclosed related to machine learning of encoding parameter values for a network using a video encoder (also referred to herein as an "encoder"). More specifically, the current disclosure relates to techniques and approaches for training and deploying one or more Machine Learning Models (MLMs) to predict values of one or more encoding parameters for a video encoder to use in streaming video over one or more networks.

In contrast to conventional approaches, disclosed approaches may apply feedback, associated with streaming video encoded by a video encoder over a network, to an MLM(s), which predicts a value(s) of an encoding parameter(s) based on the feedback. The video encoder may then use the value of the encoding parameter to encode subsequent video data for the streaming. A rewards metric(s)

may be used to train the MLM using data generated or applied to the physical network in which the MLM is to be deployed and/or a simulation thereof. Video data encoded by the video encoder in the training may be selected in order to account for categories of content that are more likely to result in a mismatch between target bitrate and encoded bitrate. By using the video encoder in training, the MLM may converge quickly and learn based on actual encoded bitrates of the video encoder. Further, hardware acceleration may be used to quickly encode the video.

In one or more embodiments, feedback associated with streaming video encoded by a video encoder over a network may be applied to an MLM(s), which predicts a value(s) of an encoding parameter(s) based on the feedback. The video encoder may then use the value of the encoding parameter to encode subsequent video data for the streaming. The MLM may be trained to predict optimal encoding parameters for the video encoder and network environment using the feedback. In one or more embodiments, the encoding parameter(s) may correspond to a bitrate setting, such as a target bitrate for the encoded video, and/or an error correction or channel coding parameter, such as Forward Error Correction (FEC). Other examples of encoding parameters include packet pacing interval, intra-refresh period, video resolution, intra-refresh interval, frame rate, audio and/or image bitrate, encoding mode, and/or pixel aspect ratio.

The feedback may correspond to an encoded bitrate of the video and/or other information associated with streaming the video over the network. In one or more embodiments, feedback may correspond to one or more characteristics of the encoded video and/or one or more characteristics of the network that are associated with and/or caused by streaming the encoded video. Examples include packet loss, stutters, network bandwidth, frame drops, macroblock count (e.g., intra and/or inter), inter/intra macroblock ratio, packet arrival time, latency, video quality, etc.

In one or more embodiments, values of a rewards metric(s) may be used to train the MLM and data used to generate a value(s) may correspond to the encoded video streamed over the network. One or more portions of the data and/or one or more of the factors used to generate the rewards metric may be the same as or different than those used to generate the feedback. For example, a value(s) of a rewards metric for one or more iterations of streaming encoded video using a value(s) of an encoding parameter(s) may correspond to data used to generate feedback for subsequent one or more iterations of streaming encoded video using a different value of the encoding parameter. By way of example and not limitation, the rewards metric may be configured to reward high bitrate, proximity between target and encoded bitrate, and/or QoS values. In or more embodiments, the rewards metric may be configured to maximize the encoded bitrate using a penalty for lost or dropped frames.

The physical network in which the MLM is to be deployed and/or a simulation thereof may be used to generate the data applied to the rewards function. For example, a simulator may simulate one or more portions of a network stack from a server (e.g., a gaming server), network infrastructure, and/or client (e.g., a gaming client). In one or more embodiments, video data encoded by the video encoder in the training may be selected in order to account for categories of content that are more likely to result in a mismatch between target bitrate and encoded bitrate. Examples of categories include video data that captures one or more of a scene change, a static scene, a low motion scene, or a high motion scene. In or more embodiments, video and/or portions or segments thereof may be labeled with one or more categories (e.g., by a human and/or software annotator), and a training system may select at least some of the video content for training based on the categories. In one or more embodiments, the training system may select a mix of training samples based on the assigned categories. In one or more embodiments, the training system may monitor performance of the MLM(s) across any of the various categories and provide additional samples for a category based on one or more associated performance metrics. In one or more embodiments, the MLM(s) may comprise one or more neural networks, which may include one or more convolutional layers, trained to categorize the video data and/or predict values of encoding parameters based on the categories (e.g., determined by the neural network or otherwise).

With reference to FIG. 1 is a block diagram of an example system 100 for training a machine learning model to learn encoding parameter values for a network using a video encoder, in accordance with one or more embodiments of the present disclosure. In one or more embodiments, the components of the system 100 represent hardware, software, middleware, or combination thereof. In one or more embodiments, the system 200 represents or includes at least a portion of a simulated environment 108 (e.g., Network Simulator (NS) 3), which includes a simulated network 106. A simulated network may include one or more software processes that model or replicate the behavior and interaction of one or more components of a real-world network (e.g., clients, servers, switches, network access points, etc.). For example, in one or more embodiments, the sender 105 models a content streaming server and the receiver 109 models a user device. In some instances, the simulated network 106 can have minimal deviation from a real-world network, which can help to directly transfer and deploy functionality or the trained machine learning model(s) 107 to a real-world environment (e.g., the system 200 of FIG. 2) without any need for fine-tuning or transfer learning. Since training on a real world network stack may be slow and may require a complex interconnected infrastructure, the simulated network 106 may be used for training optimization. In alternative embodiments, the system 200 represents a real-world environment that includes a real-world network (as opposed to a simulated environment 108 that includes a simulated network 106) with hardware-based network components (e.g., in which the MLM is to be or is deployed or with at least some similar or same components), such as a blade server or client devices.

To train the MLM(s) 107, one or more servers 105 receive training video content and the video encoder 103 converts the training video content into encoded video data. An "encoding parameter," as described herein may refer to any attribute associated with encoding data. For example, in one or more embodiments, an encoding parameter can be or include bitrate, channel coding such as Forward Error Correction (FEC), video resolution, intra-refresh interval, and packet pacing interval, or any encoding parameter described herein or may otherwise be provided to a video encoder to impact a video encoding process. Different network states or impairments, such as packet loss or delays, as well as encoding parameters controlling these states, such as bitrate, Forward Error Correction (FEC), packet pacing, and intra-refresh period, have a strong correlation. For instance, while streaming at a high bitrate may cause stutters due to packet loss, using a low bitrate can lead to poor visual quality.

In light of this high correlation, one or more embodiments of the present disclosure learn to output one or more optimal encoding parameter values given a set of network state and/or encoding characteristics. In game streaming, for example, efficient encoding with optimal encoding parameter values at server side results in superior QoS, achieving a seamless game streaming experience at the client side. An inferior bitrate encoding of video games results in lower game visual quality at the client side. However, encoding with higher bitrate than available bandwidth leads to transmission of higher bits from server to client. This may increase network congestion resulting in higher round trip delay or latency. This may further result in packet losses and frame drops at the client resulting in inferior streaming experiences. Accordingly, one or more embodiments of the present disclosure learn to dynamically output optimal encoding parameter values so as to maintain a superior streaming experience.

In one or more embodiments, the video encoder 103, or any video encoder described herein, encodes data by converting it into a compressed format. In one or more embodiments, the video encoder 103, or any video encoder described herein, may perform such conversion by reducing the amount of frames and/or data that makeup a video sequence. For example, if two frames of a video sequence are identical, the video encoder 103 can remove one of the frames. Alternatively or additionally, in one or more embodiments, the video encoder 103, or any other video encoder described herein, may convert video files from one standard format into another (e.g., mp4 to .fly).

In one or more embodiments, the video encoder 103, or any video encoder described herein is a software module. Alternatively or additionally, in one or more embodiments, the video encoder 103, or any video encoder described herein, is hardware accelerated. Hardware acceleration—as it relates to encoding—may refer to the process by which an application will offload particular encoding tasks onto specialized hardware components, which may enable greater efficiency than is possible in software running on a general-purpose CPU alone, for example.

In one or more embodiments, the training video content represents any suitable video content, such as video game content, movie content, television content, video monitoring content, machine learning video content, fully or semi-autonomous driving video content, social media video content, or the like. In one or more embodiments, the training video content explicitly contains data where certain video encoder parameters typically result in a significant mismatch between the optimal bitrate for the stream and the encoded bitrate that is achieved by the encoder. This may occur, for example, in situations where the video data represents content that cannot easily be compressed or that is highly compressible and/or transitions between such categories of content. Examples of content that cannot easily be compressed include scene changes, high motion scenes, and the like. Examples of content that is highly compressible includes static scenes (e.g., a pause menu of a video game) or low motion scenes. Bitrate may refer to a quantity of bits that are transmitted or processed per unit of time (e.g., seconds). With such a wide variety of training video content, the one or more MLM(s) 107 is may learn optimal encoding parameters (e.g., target encoding parameter values) for streaming content of different types, as described in more detail herein.

A sender 105 receives, from the video encoder 103, the video content encoded at the video encoder parameter value(s) determined using the MLM 107 and then streams or provides the video content corresponding to the video encoder parameter(s) to a receiver 109. In an illustrative example, the video encoder 103 can encode a static video game scene from 6 Mb/s (Megabits per second) to several hundred Mb/s and then transmit to the sender 105 the static video game scene at several hundred Mb/s. The sender 105 can then send over the simulated network 106, the static video game scene at several hundred Mb/s to the receiver 109. In one or more embodiments, in response to receiving this video content encoded at the particular video encoding parameter value(s), the receiver 109 (and/or other component in various embodiments) monitors one or more attributes of the network and generates associated statistics. In one or more embodiments, such statistics indicate one or more characteristics of one or more network states (also referred to herein as "network conditions") like bandwidth, packet loss, and packet arrival times etc., and/or statistics that indicate one or more characteristics of the encoded video content (e.g., the training video content encoded by the video encoder 103), such as encoded bitrate, latency values, stutter values, the quantity of frame drops (e.g., via a frame drop flag), and video quality. In one or more embodiments, a frame drop occurs when a video frame is not encoded or is otherwise missed or skipped, which may result in the video frame not being displayed at a client device. Video data can include data that represents a contiguous sequence of video frames (e.g., still images). When there is a frame drop, for example, a client device may skip display from a first video frame to a third video frame (instead of displaying, directly after the first video frame, a second video frame).

In one or more embodiments, such network state statistics are generated or sent (e.g., to the MLM(s) 107) in near-real-time relative to the time the network state is monitored or encoded data is processed. Alternatively, in one or more embodiments, such network state statistics are generated or sent at a particular batched time interval threshold (e.g., every 5 minutes) or are sent based on an event-based threshold (e.g., every 200 video frames processed).

In one or more embodiments, such network state conditions and other statistics can responsively be used or transmitted, as feedback, from the receiver 109, over the simulated network 106, to the sender 105 and from the sender 105 to the server(s) 104, which then pass the feedback to the one or more machine learning models 107, as illustrated in FIG. 1. In one or more embodiments, the feedback is used as input to train the MLM(s) 107 to predict at least a target value of the encoding parameter (e.g., for the next video data frame, segment, or cycle). As described herein, one or more embodiments strike an optimal balance between encoding parameter values for current network state or channel conditions. In one or more embodiments, the MLM(s) 107 (e.g., a neural network) is trained to determine optimal encoding parameter values (e.g., target encoding parameter values) for video content, such as game content, given current network state as may be received from a gaming client.

In one or more embodiments, the MLM(s) 107 performs such training using reinforcement learning. In reinforcement learning, an agent (e.g., the server(s) 104) finds the best possible path to reach a reward. In one or more embodiments, the rewards are computed at the server(s) 104 based on receiving the feedback via the simulated network 106. The server(s) 104 updates the MLM(s) 107 weights per the computed rewards. In one or more embodiments, the reward is given for maximizing a bitrate of the video encoded by the video encoder 103. Accordingly, the higher the encoding parameter value, the higher the reward. One or more embodiments impose a penalty for any of the statistics being below, meeting, or exceeding a threshold. For instance, frames lost can be directly proportional to the penalty—the more video frames that are lost, the higher the penalty. In this way, for example, embodiments can train the MLM(s) 107 maximize the encoded bitrate while at the same time reducing frame losses to obtain the highest reward that is not disproportionately discounted by frame loss penalties.

In one or more embodiments, rewards are additionally or alternatively offered based on high video quality, low FEC percent, fewer stutters, higher intra-refresh period (lower refresh overhead), high resolution, low packet pacing interval, and/or smoother change in video quality. In one or more embodiments, an asynchronous advantage actor-critic framework can be used for training, with a policy gradient algorithm such as Proximal Policy Optimization (PPO) being used to update network weights during training.

The penalty in reinforcement learning can be applied in response to the values of any metrics meeting, exceeding, or being below a threshold. For example, a penalty can be imposed when: the bandwidth is below a threshold, the latency is below a threshold, the stutters exceed a threshold, and/or the like. In this way, an optimal parameter encoding value is learned for one or more encoding parameters. As described above, for example, streaming at too high of a bitrate may cause stutters due to packet loss, but using too low of a bitrate can lead to poor visual quality. Accordingly, while the MLM(s) 107 may provide more or higher rewards for a higher bitrate, this reward may be reduced by the penalty of stutters because higher bitrates may cause stutter and poor visual quality. Accordingly, the MLM(s) 107 learn the optimal bitrate for a given set of training data. In one or more embodiments, cumulative rewards and penalties are computed for the entire training data set and is plotted over training steps. As the MLM(s) 107 learns and converges, accumulated rewards increase over time. Machine learning model embodiments are described in more detail herein.

In one or more embodiments, various aspects, such as diminishing returns, can be included in video quality with increasing bitrate in a reward function by using an exponentially increasing penalty for higher bitrate. In one or more embodiments, having higher weight for a stutter penalty at higher bitrates helps this policy to not increase bitrate at a cost of stutters at a very high bitrate operating point.

In one or more embodiments, reward/penalty functionality can be implemented to reduce disconnection errors (e.g., late arrival of packets, stutter, etc.). One or more embodiments reduce these errors by quickly reacting to changing network conditions via reward/penalty functionality. For instance, one or more embodiments exponentially or otherwise functionally increase a penalty with delays in factors such as an arrival of packets. In one or more embodiments, a cost function can be used that attempts to maximize a reward. Such an approach can help to reduce disconnection errors by a significant amount.

Alternatively or in addition to reinforcement learning, in one or more embodiments, the MLM(s) 107 performs training using supervised techniques. For example, in one or more embodiments, the MLM 107 directly receives and processes the video training data and learns weights of features of the corresponding video training data. For example, the MLM(s) 107 can received labeled or annotated video data, which has been labeled as "high motion scene" (1) and "low motion scene" (2) (or any suitable label or category described herein, such as "scene change"). These annotated video data can then be fed into the MLM(s) 107, where the MLM(s) 107 learn weights corresponding to the optimal video encoding parameter value for the given label(s).

In one or more embodiments, learning or training can include minimizing a loss function between the target variable or encoded video output (e.g., corresponding to the at least one encoding parameter value) and the actual variable or encoded video output (e.g., the value that video encoder should have encoded with, such as to have no (or minimal) mismatch between target and encoded bitrate) given the specific feedback. Based on the loss determined by a loss function (e.g., Mean Squared Error Loss (MSEL), cross-entropy loss, etc.), the loss function learns to reduce the error in prediction over multiple epochs or training sessions so that the model learns which features and weights are indicative of optimal encoding parameter values for given feedback data. Accordingly, it may be desirable to arrive as close to 100% confidence in a particular classification and/or output value as possible so as to reduce the prediction error. In an illustrative example, the MLM(s) 107 can learn over several epochs that for a given set of network conditions or other feedback (e.g., bandwidth, frame drops), (which is an input to the MLM(s) 107), the optimal target bitrate is a particular bitrate value.

In one or more embodiments, the MLM(s) 107 is trained to minimize packet losses while keeping overhead packets low. For example, an FEC algorithm can dynamically determine step-size based on a severity of packet losses in a network. Accordingly, this algorithm can help to reduce frame invalidations (e.g., losses) by quickly adapting to changing network conditions. In one or more embodiments, a forward pass through the MLM(s) 107 is accelerated using a deep neural network accelerator, such as tensor cores from NVIDIA Corporation, to ensure real-time performance.

Subsequent to a first round/epoch of training the MLM(s) 107 (e.g., processing the "training video content"), as illustrated in FIG. 1, the target encoding parameter value is provided to the video encoder 103 so as to instruct the video encoder 103 to use such a target encoding parameter value when encoding a next set of data (e.g., stream data stored in a queue data structure). The video encoder 103 responsively converts received video data (e.g., training video content) using the target encoding parameter value. The process described above with respect to the sender 105, receiver 109, and the MLM(s) 107 may then be repeated over multiple iterations or epochs until the optimal target encoding parameter value(s) is learned (e.g., by maximizing rewards and minimizing losses) and/or the loss function reduces the error in prediction to acceptable levels of confidence.

The system 100 illustrates, among other things, that the video encoder 103 (e.g., in a DL based QoS algorithm for enhanced gaming experience) may encode at the exact encoder parameter value (e.g., bitrate), which reduces the training time considerably relative to environments that fail to use a video encoder (or use a simulated video encoder). This is because using a video encoder in training more closely mimics deployment environments, which typically use video encoders. Accordingly, because both training and deployment environments utilize a video encoder, video encoder statistics are likely to be more accurate, and therefore the feedback will be accurate, as well as the MLM predictions of encoding parameter values using the feedback as inputs.

Relative to simulated encoders or no-encoder environments, particular encoding parameter values are more accurate and capture scene dynamics well for scenes such as scene changes, high motion scenes, static scenes, and the like. Because the video encoder 103 is used in training, network state and encoder statistics and predictions are more aligned with or match deployment functionality. For example, a simulated encoder is likely to be inaccurate with respect to properties of encoded video data. Therefore, for example, computed bitrates as well as target bitrates may be different in training environments versus deployment environments. This means that deployment environments may take longer to train on given the inaccuracies with no video encoders used or the simulated video encoder used in existing training systems. Alternatively or additionally, this may result in frame losses during deployment, when, for example, an encoded bitrate exceeds available bandwidth. For example, it is possible that the encoded bitrate can exceed available bandwidth for i frames and IDR frames, which consume higher bits. This results in packet loss and subsequently frames drop at client side if packet losses are higher than available FEC.

Using a video encoder, such as the video encoder 103, in the training system 100 has several advantages relative to no-encoder or simulated encoder embodiments. For example, actual packet losses and stutter depend on video encoder bitrate in certain applications or environments, such as GeForce Now (GFN), a cloud gaming platform. However, simulated encoders do not reflect actual encoding attributes and performance impacts. Embodiments of the present disclosure may obtain or account for the exact encoded bitrate produced using a video encoder and use it in end-to-end training of a machine learning model (e.g., to mimic GFN). One or more embodiments further account for encoded bitrate on the fly using reinforcement learning, so that training can continuously occur in training using a video encoder. One or more embodiments further use actual bitrate as an additional input into a machine learning model. This makes predictions of target bitrate or other encoding parameter values more accurate. Not only may video encoders be used, but one or more embodiments, as described with respect to FIG. 1, learn what encoding parameter values a video encoding parameter should be outputting for future video data (e.g., the target encoding parameter value).

A simulated encoder may compute encoded bitrate(s) based on encoder utilization percentage derived from data from past experiences (e.g., game streaming sessions). However, there is a dependency of encoder utilization percentage on a target bitrate. One main assumption with simulated encoders is that encoder utilization percentage is independent of everything else in the environment, such as the reinforcement learning output or network conditions. But this is simply not the case. Rather, there is a dependency of encoder utilization percentage on target bitrate, among other encoding parameters. Current frame target bitrate dictates encoder utilization percentage, which in turn controls frame size. Utilization time is typically computed based on frame size, which determines bandwidth estimate, and which decides the reinforcement learning output. In various instances, the next frame target bitrate is based on reinforcement learning output and next frame encoder utilization percentage is computed based on next frame target bitrate. Accordingly, the encoder utilization percentage is not independent of everything else in the environment.

In one or more embodiments, when the video encoder 103 is enabled in training, training systems are much closer to real-world network environments. This should enable machine learning models to learn any subtle correlations in the training data inputs, and perform more accurately relative to non-video encoder environments. Relative to simulated encoders, real-time encoder bitrates with a video encoder are more accurate and capture dynamics of certain scenes well, such as scene changes, high motion scenes, static scenes, and the like.

Figure 2:
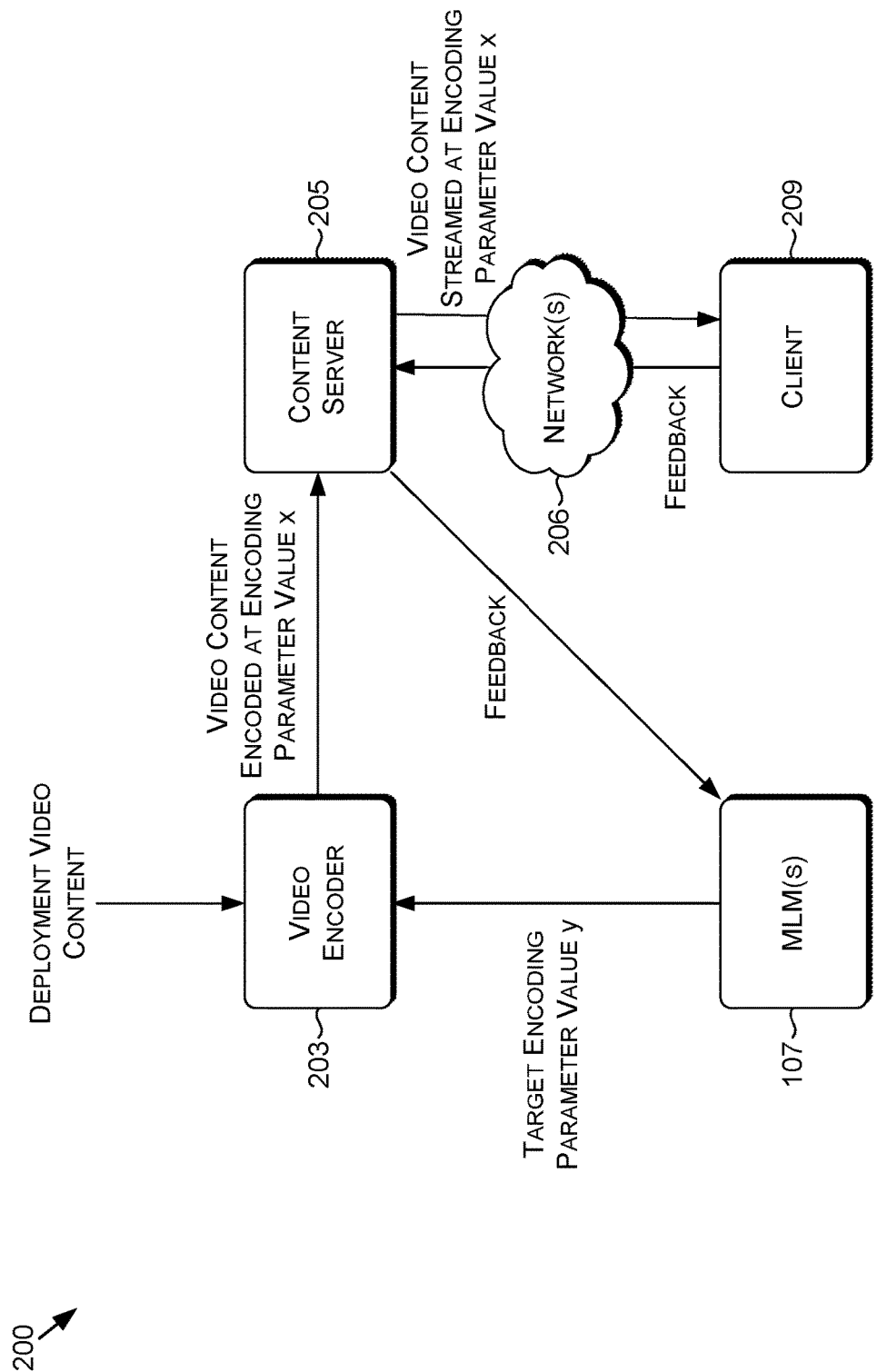
FIG. 2 is a block diagram of an example deployment system, in accordance with one or more embodiments of the present disclosure.

FIG. 2 is a block diagram of an example deployment system 200 for selecting encoding parameter values to stream video content across a network based on using a trained machine learning model, in accordance with one or more embodiments of the present disclosure. In one or more embodiments, some or each of the components employ identical or similar functionality as described with respect to the components of FIG. 1. For example, in one or more embodiments, a content server 205 includes at least some of the functionality as described with respect to the sender 105 of FIG. 1. In one or more embodiments, a client 209 (e.g., a mobile phone) includes at least some of the functionality as described with respect to the receiver 109 of FIG. 1. In one or more embodiments, a video encoder 203 includes at least some of the functionality as described with respect to the video encoder 103 of FIG. 1 (e.g., is the same video encoder). The MLM(s) 107 in FIG. 2 represents the trained MLM(s) 107 of FIG. 1. In one or more embodiments, the video encoder 203 represents the exact video encoder (i.e., 103), as used with the system 100 in order to account for potential device-specific disparities for particular encoding parameter values.

The video encoder 203 may receive the deployment video data and encode the deployment video data at encoding parameter X. The video content encoded at encoding parameter value X is then passed to the content server 205. The content server 205 is any suitable server that provides any suitable content data, such as video game data, movie data, and the like. The content server 205, then streams, over the one or more networks 206, the video content encoded at the encoding parameter value X to the client 209. For example, the content server 205, can stream, a paused game scene, to a television set. The client 209 then monitors a condition of the one or more networks 206 and/or the encoded data. For example, as described above, the client 209 can calculate bandwidth, an indication that the content was streamed at encoding parameter value X (e.g., a particular bitrate value), a drop flag, stutter data, and the like. This client 209 can then transmit this data (i.e., feedback), over the network(s) 206 to the content server 205, which then transmits the data to the MLM(s) 107. The MLM(s) 107 uses the feedback to predict the target encoding parameter Y (e.g., a target bitrate value that the video encoder 203 should encode a next video frame or video segment (multiple frames) at). In one or more embodiments the feedback used by the system 200 may correspond to the same statistics and/or metrics used by the system 100 for training.

In one or more embodiments, because the MLM(s) 107 has been trained via the system 100 of FIG. 1, the MLM(s) 107 is able to associate the current feedback with trained feedback in order to predict an optimal encoding parameter value or otherwise determine encoding parameter value patterns given the feedback. For example, the MLM(s) 107 can learn that for a given set of network conditions or other feedback (e.g., bandwidth, frame drops), (which is an input to the MLM(s) 107), the optimal bitrate is a particular value. Accordingly, at deployment time, the MLM(s) 107 can receive feedback that the bandwidth or frame drops are within a threshold value to these trained values and then responsively predict that the optimal bitrate is the particular value. Such "threshold" can be in terms of distance (e.g., Euclidian or Cosine distance), hash differences, or the like. For example, the MLM(s) 107 may convert the feedback into a first feature vector and determine, in feature space, that a second feature vector representing feedback that that the MLM(s) 107 has trained on is closest in distance (e.g., via a Euclidian or Cosine distance) to the first feature vector relative to any other feature vectors. Both feature vectors may be a part of a cluster or classification that belongs to video encoder target parameter Y, for example. Accordingly, the prediction may be that the feedback falls under a cluster or classification corresponding to the video encoder target parameter value Y. Therefore, the video encoder 203 may receive this target encoding parameter value Y and thus be instructed to convert second video content encoded at target encoding parameter value Y (instead of parameter value X). In one or more embodiments, such predictions by the MLM(s) 107 at deployment occurs on a video frame-by-frame (or set of frames) basis.

As described herein, in one or more embodiments, the MLM(s) 107 directly receives and processes the deployment video content itself, where, for example, the MLM(s) 107 has been trained on actual video data using labels. For example, if the MLM(s) 107 detects a static scene, scene change, or high motion scene in the deployment video data, the MLM(s) 107 can predict the target encoding parameter value Y based on this detection. For example, a feature vector representing a static scene may be detected. Such feature vector may be closest to, in feature space, another feature vector representing a particular video encoding target parameter value Y, which is indicative of learning that for a given static scene, the most suitable target encoding parameter value is Y, and not other values.

In one or more embodiments, the process described above (e.g., a single forward pass) with respect to the content server 205, client 209, and the MLM(s) 107 is then repeated for an entire session or other passes (e.g., a gaming session) for each data frame and/or other data segment needing to be processed. In one or more embodiments, this process is performed, in parallel, for other sessions, such as in a multi-player gaming environment, or where video content is streamed to multiple people in parallel.

In one or more embodiments, an early update mode can be used to handle situations where network conditions are changing rapidly and/or drastically as the process described above is repeated. For example, in an early update mode a forward pass can be run much earlier, without waiting for a previous cycle to complete or video data frame to be processed. In one or more embodiments, a recovery mode can be used that is triggered when upstream packets are lost and there has not been any new feedback data for a period of time, such as a number of seconds.

In one or more embodiments, long-term-planning can be incorporated in an optimization approach by forcing an optimization agent to take an action for an upcoming period of time, such as a next N seconds. In one or more embodiments, such an approach can help the MLM(s) 107 to learn to anticipate what is upcoming, rather than merely reacting to changing network conditions. In one or more embodiments, this prediction capability can reduce stutters and improve overall content experience, such as gaming experience. In one or more embodiments, long-term planning can also help in scenarios where a Round Trip Delay (RTD) is very high, which may lead to uplink feedback packet losses or delays. In one or more embodiments, a predictive capability enables continued streaming of high quality content without having to resort to lower bitrates. In one or more embodiments, long-term planning makes such an approach more robust to uplink feedback packet losses and delays, as well as to networks with high RTD.

As described above with respect to the training system 100, there may be a mismatch in generated feedback statistics with respect to characteristics of encoded video content (e.g., bitrate) between training environments without encoders (or with simulated encoders) and deployment environments (e.g., the system 200) in content streaming. This may be because in deployment, actual packet losses, for example, are computed based on encoded bitrate (via the use of an actual encoder) and not based on the target bitrate, which is only what some training systems may use when there is no video encoder (or a simulated encoder) to formulate actual encoded bitrates. Encoded bitrate, for example, can be different from target bitrate for scenes that fall into such categories as, static scenes, low motion scenes, Intra (I-) frames occurring due to scene changes, or DR frames which may occur due to DRC or frame drops. Accordingly, both training (e.g., via the training system 100) and deployment (e.g., via the system 200) are better matched by use of a video encoder. A video encoder, for example, can be used to generate an optimal bitrate to minimize packet loss and stutter, thereby enhancing a game streaming experience.

Figure 3:
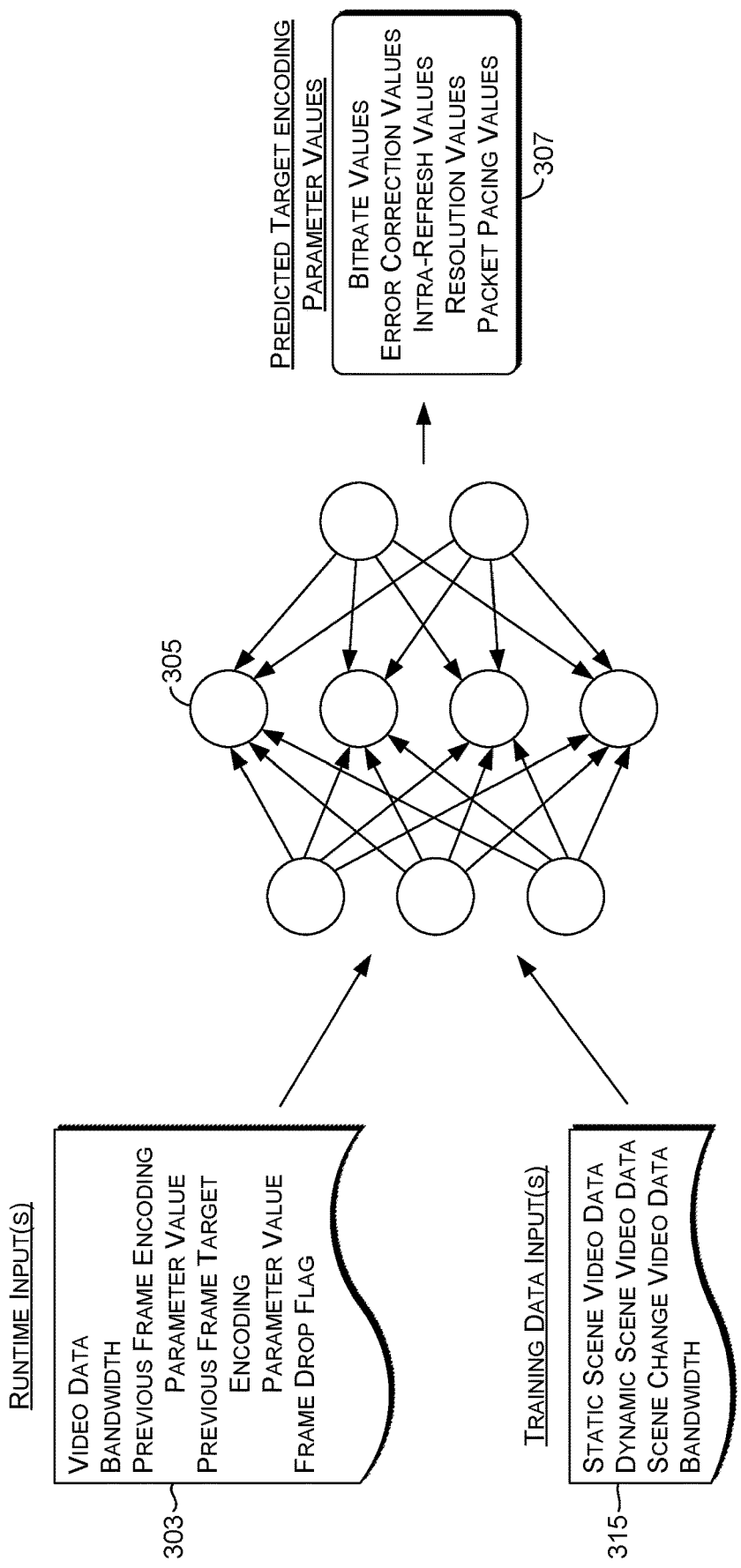
FIG. 3 is a schematic diagram illustrating the potential inputs fed to a neural network to generate predicted encoding parameter values, in accordance with embodiments of the present disclosure.

FIG. 3 is a schematic diagram illustrating the potential inputs fed to a neural network (or other MLM(s)) to generate predicted encoding parameter values, in accordance with embodiments of the present disclosure. In one or more embodiments, the neural network 305 represents or includes at least some of the functionality as described with respect to the MLM(s) 107 of FIG. 1 and FIG. 2. In one or more embodiments, the training data input(s) 315 includes or represents one or more inputs used to train the MLM(s) 107 via training at the training system 100 of FIG. 1. Similarly, in one or more embodiments, the runtime input(s) 303 may include or represent one or more inputs used by the MLM(s) 107 of the system 200 in order to make an inference according to FIG. 2. It is understood that the training data input(s) 315 and the runtime input(s) 303 are representative only. As such there may be more or fewer inputs. Additionally, only a select subset of the inputs listed may be inputs to the neural network 305. For example, in one or more embodiments, the video data for both inputs 303 and 315 may not directly be fed as input into the neural network 305, but the rest of the inputs may be fed to the neural network 305.

In one or more embodiments, the neural network 305 converts or encodes the runtime input(s) 303 and training data input(s) 315 into corresponding feature vectors in feature space (e.g., via a convolutional layer(s)). A "feature vector" (also referred to as a "vector") as described herein may include one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value (e.g., video data, feedback, bandwidth, previous frame encoding parameter value, previous frame target encoding parameter value, and frame drop flag, within the runtime input(s) 303) into a one or more feature vectors.

In one or more embodiments, the neural network 305 learns, via training, parameters or weights so that similar features are closer (e.g., via Euclidian or Cosine distance) to each other in feature space by minimizing a loss via a loss function (e.g. Triplet loss or GE2E loss). Such training occurs based on one or more of the training data input(s) 315, which are fed to the neural network 305. For example, the training data input(s) 315 can correspond to a bandwidth value and/or video data (static scenes, dynamic scenes, and scene changes).

One or more embodiments can determine one or more feature vectors representing the input(s) 315 in vector space by aggregating (e.g. mean/median or dot product) the feature vector values to arrive at a particular point in feature space. For example, certain embodiments can formulate a dot product of the bandwidth, a previous (or current) bitrate encoded by a video encoder, and a previous target bitrate generated by the neural network, and then aggregate these values into a single feature vector.

In one or more embodiments, the neural network 305 learns features from the training data input(s) 315 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of the training, one or more embodiments learn an embedding of feature vectors based on learning (e.g., deep learning) to detect similar features between training data input(s) 315 and/or the predicted target parameter values 307 in feature space using distance measures, such as cosine (or Euclidian) distance. For example, the training data input 315 is converted from string or other form into a vector (e.g., a set of real numbers) where each value or set of values represents the individual features (e.g., bandwidth values of previous frame) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for a first bandwidth value at the training input(s) 315, the neural network can learn to output a particular bitrate value at 307 (e.g., based on maximizing rewards and reducing penalties). Consequently, this pattern can be weighted (e.g., a node connection is strengthened to a value close to 1, whereas other node connections representing the second set of symptoms are weakened to a value closer to 0). In this way, embodiments learn weights corresponding to different features such that similar features found in inputs contribute positively for predictions.

In one or more embodiments, subsequent to the neural network 305 training, the machine learning model(s) 305 (e.g., in a deployed state) receives one or more of the runtime input(s) 303. Responsively, in one or more embodiments, the input(s) 303 are automatically converted to one or more feature vectors and mapped in the same feature space as vector(s) representing the training data input(s) 315 and/or training predictions (e.g., learned target bitrate given the training input(s) 315). Responsively, one or more embodiments determine a distance (e.g., a Euclidian distance) between the one or more feature vectors and other vectors representing the training data input(s) 315 or predictions, which is used to generate a decision statistic or other value(s)—i.e., the predicted target parameter values 307. For example, using the illustration above, the bandwidth value of the runtime input(s) 202 may match or be the same as the first bandwidth value. Accordingly, because the neural network 305 has already learned to output a particular bitrate value at 307 (e.g., based on maximizing rewards and reducing penalties) given the first bandwidth value, and this first bandwidth value has already been weighted (e.g., a node connection is strengthened to a value close to 1) to output the particular target bitrate value, the target bitrate value may be predicted at 307. In certain embodiments, the predicted target parameter values at 307 or any decision statistics may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem (e.g., a new video encoder, new feedback, etc.).

Figure 4:
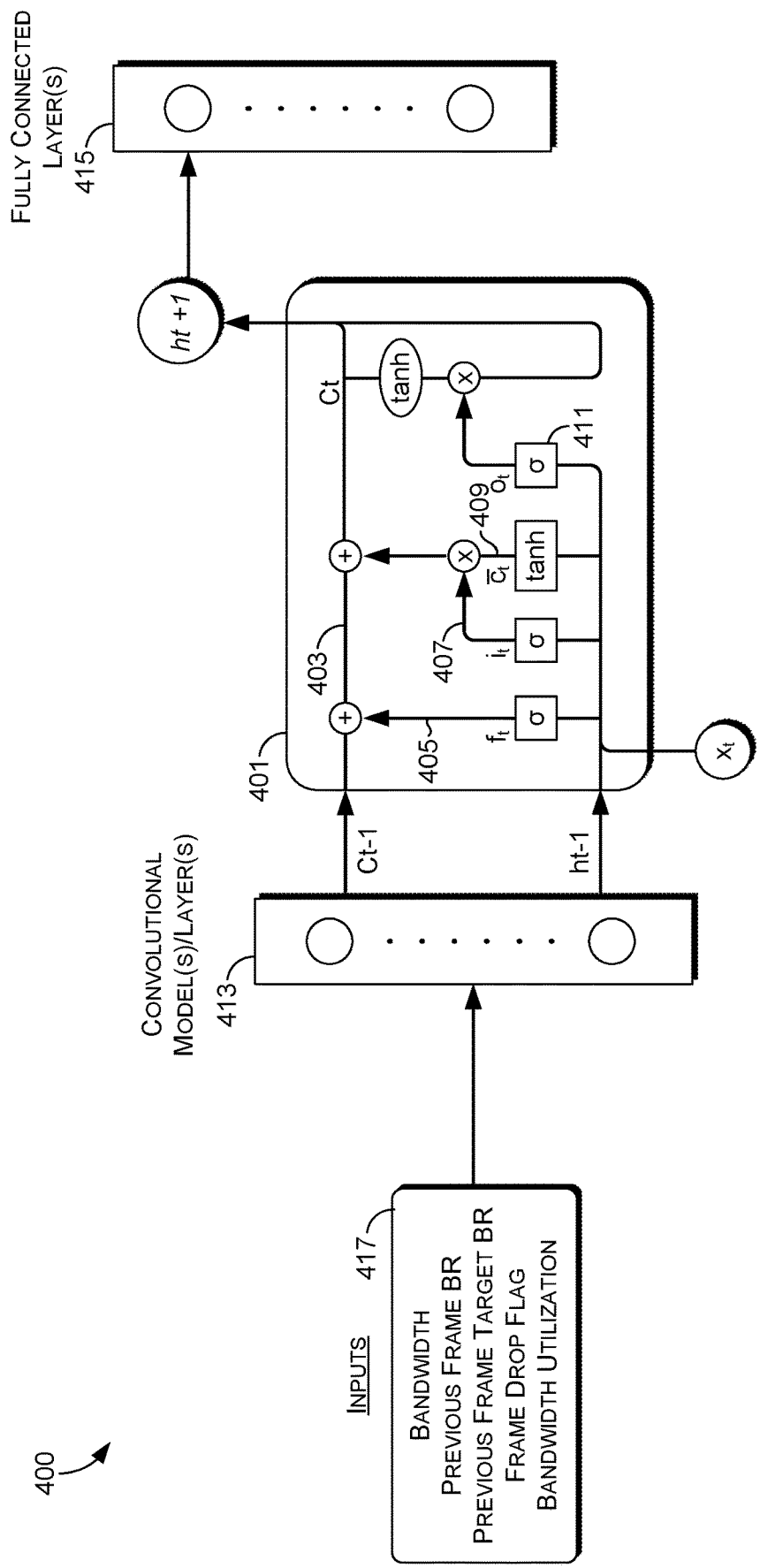
FIG. 4 is a schematic diagram of an example machine learning model architecture, in accordance with embodiments of the present disclosure.

FIG. 4 is a schematic diagram of an example machine learning model architecture 400, for which embodiments of the present disclosure may employ. The machine learning model architecture 400 includes one or more convolutional layers 413, which are connected to a Long-Short-Term-Memory (LSTM) model 401 (or one or more cells 401), which is connected to a set of fully connected layers 415. In one or more embodiments, the machine learning model architecture 400 represents or includes at least some of the functionality as described with respect to the MLM(s) 107 of FIG. 1, FIG. 2, and/or the neural network 305 of FIG. 3.

In one or more embodiments, the machine learning model architecture 400 uses convolutional layers(s) 413 to extract features from the inputs 417, the LSTM model 401 to capture past temporal information (e.g., past network condition statistics, past encoding parameter values encoded by a video encoder, past encoding parameter statistics, and/or past target encoding parameters), and the fully connected layer(s) 415 to predict future actions, such as predicting a target encoding parameter value to use for streaming a next video frame or sequence. In one or more embodiments, context of few seconds-worth of most recent network conditions statistics or encoding parameter statistics can be passed to this machine learning model architecture 400 to strike a balance between a number of LSTM layers or cells required, thereby keeping a cost of inferencing low during streaming. In one or more embodiments, such a design decision can be important to achieve a very high FPS (>120 FPS) gaming content while still keeping a cost of streaming low.

The convolutional layer(s) 413 may generally be responsible for extracting features from the input(s) 417. In one or more embodiments, the inputs 417 alternatively or additionally include one or more of the inputs, as described with respect to the runtime input(s) 303, the training data input(s) 315, and/or the inputs described with respect to the MLM(s) 107 of FIG. 3, FIG. 2, and FIG. 3 respectively. In one or more embodiments, the convolutional layer(s) 413 extracts features by applying a convolution operation to the inputs 417. For instance, where video data is fed to the model 400 as input, a convolution converts all the pixels in its receptive field into a single value. This may decrease the image size and bring all information in a field together into a single pixel. Where no image data is used as input, a convolution may convert the bandwidth values, the previous frame bitrate value, the previous frame target bitrate, the frame drop flag (or other inputs), and the bandwidth utilization (bitrate to throughput ratio) to a single value or feature vector. Accordingly, in one or more embodiments, the final output of the convolutional layer(s) 414 may include a feature vector that represents all values of all of the inputs 417. In one or more embodiments, with respect to the convolutional layer(s) 413, a neuron is only connected to a local area of input neurons (instead of full-connection (e.g., fully connected layer(s) 415) so that the number of parameters to be learned is reduced significantly and a network can grow deeper with fewer parameters. In one or more embodiments, the convolutional layer(s) 413 includes convolution, batch normalization, and rectified linear unit (ReLU) activation.

Although FIG. 4 illustrates an LSTM 401, it is understood that this is illustrative only and that any quantity or type of models can be used. For example, in one or more embodiments, other Recurrent Neural Networks (RNNs) can alternatively be used instead of an LSTM. For example, Bidirectional Recurrent Neural Networks (BRNN), or Gated Recurrent Units (GRU) models can be used.

FIG. 4 illustrates how a vector representing the inputs 417 is used to predict a target bitrate value (or other target encoding parameter value). The LSTM model function may assume that a downstream event (e.g., statistics generated for a last-in-time video frame) depends upon, and is a function of, one or more events that came before (e.g., statistics generated for a first-in-time video frame in the same gaming session). In other words, LSTM models may share weights over time. In a video content context, the model can learn target encoding parameters over time based on past network condition or encoding statistics (e.g., previous frame encoded bitrate, previous bandwidth value, previous number of frame drops).

An element or cell (e.g., cell 401) may correspond to a vector representing a portion or attribute (e.g., a video frame or sequence of video frames) of video 108 content. In an illustrative example, the cell 401 may represent one or more aspects of a video data sequence (a frame-by-frame video feed over time X) indicative of particular scene, such as a high motion scene, low motion scene, or scene change. The cell state 403 corresponds to selective memory of past cell states (i.e., it takes data (e.g., vector values) that has been forgotten or disregarded and data that has been remembered or preserved) and passes on remembered data to the next cell or step. When data arrives at the last cell (representing the last-in-time portion of an utterance), $C_t$ is linearly combined with $h_{t+1}$ such that $h_{t+1}$ is the final output.

In one or more embodiments, the first operation occurs when the forget gate layer 405 (a sigmoid layer) determines what vector values gets removed from the cell state 403, as represented by $f_t=\sigma(W_f\cdot[h_{t-1}, x_t]+b_f)$. It takes $h_{t-1}$ (e.g., the previous cell state corresponding to a previous bandwidth value, previous encoded bitrate, or previous frame drop flag) and $x_t$ (e.g., current vector values corresponding to a current previous frame drop flag) and outputs a number between 0 and 1. A value close to or within a threshold of value of 1 indicates true or keep this data while a 0 or value within a threshold value of 0 indicates forget or get rid of the data. A previous cell state indicates at least a portion the vector values that were passed from the previous cell, as opposed to the overall sell state that indicates at least a portion the data that was passed for at least a portion of cells (e.g., vectors or portions of an entire video content sequence) up until a particular point.

In one or more embodiments, the next operation is to determine what information will be stored or moved along the cell state 403, as represented by $i_t=\sigma(W_i\cdot[h_{t-1}, x_t]+b_i)$; $\tilde{C}_t=\tanh(W_C\cdot[h_{t-1}, x_t]+b_C)$. This occurs via the input gate layer 407 (another sigmoid layer) and the tanh layer 309. The gate layer 407 determines which vector values will be updated and the tanh layer 409 generates a single vector of new candidates $C_t$. In an example illustration, embodiments can forget vector representations of video segments/frames that are: duplicative, outside of a time window threshold, are below a motion threshold for high motion scenes, are above a motion threshold for low motion/static scenes, outside of a network or encoding statistics threshold, and the like.

Certain embodiments then update the previous cell state 403 ($C_{t-1}$) into the new cell state $C_t$, as represented by $C_t=f_t*C_{t-1}+i_t*\tilde{C}_t$. Accordingly, the previous cell state ($C_{t-1}$) is multiplied by 405, forgetting the vectored values described above. Then, the input gate layer 407*the tanh layer 309 is added. In the last step, it is determined what is outputted, which is represented by $o_t=\sigma(W_o[h_{t-1}, x_t]+b_o)$; $h_t=o_t*\tanh(C_t)$. The output is based on the new cell state $C_t$, which is a filtered version of the cell state. A sigmoid layer determines what parts of the cell state 403 ($C_{t-1}$) will be output. The cell state 403 is run through tanh so that the values are between −1 and 1, represented by the final output $h_{t+1}$, and this is multiplied by the sigmoid gate 411 so only the necessary values are outputted. In one or more embodiments, the final output $h_{t+1}$ is passed to the fully connected layer(s) 415 in order to predict the target parameter values for the next time sequence (e.g., a target bitrate for the next video sequence given the past remembered statistics). The fully connected layer(s) 415 are layers where all the inputs from the LSTM 401 are connected to every activation unit of the next layer. In other words, the fully connected layer(s) 415 learn weights to generate a target parameter encoding value (e.g., a classification of the value that needs to be outputted). Accordingly, in one or more embodiments, the output of the fully connected layer(s) 415 is a single vector where each value or set of values of the vector is a non-binary (e.g., float, integer, decimal) between −1 and 1 and where each value represents the probability of the video content needing to be encoded at a particular target encoding parameter value.

Figure 5:
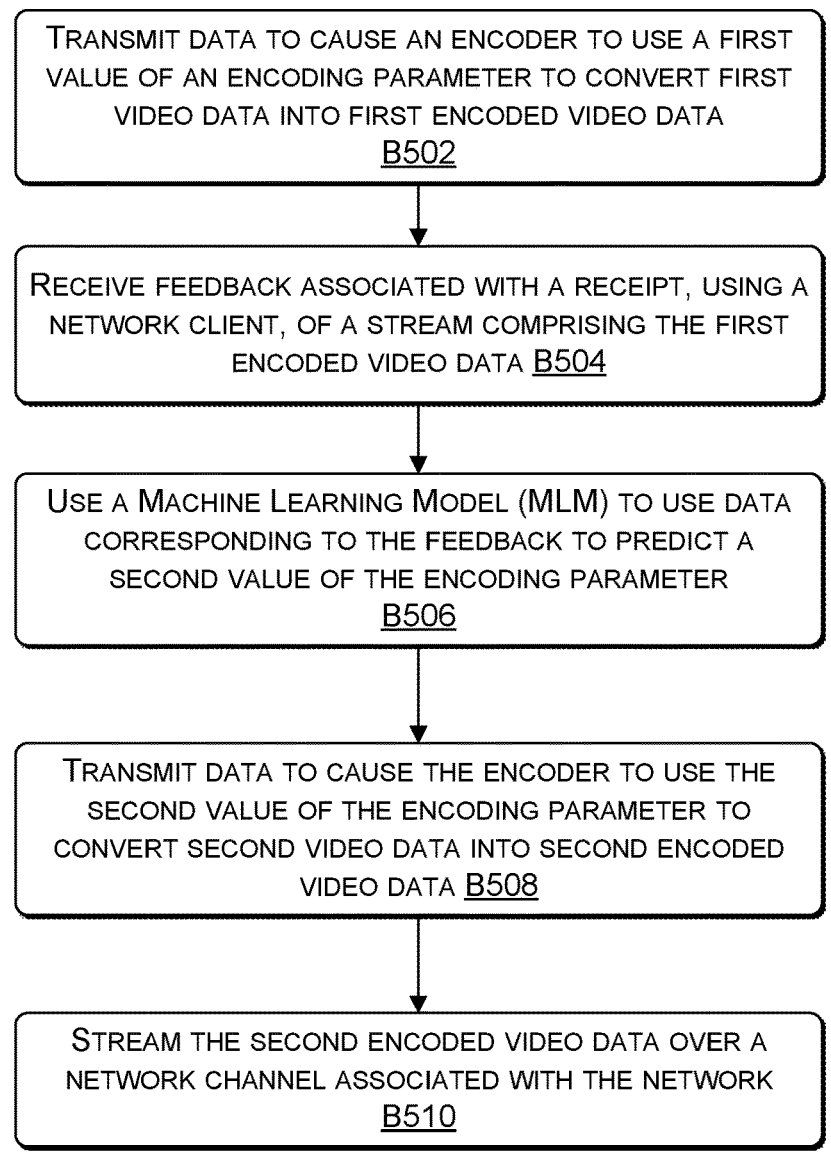
FIG. 5 is a flow diagram of an example process for training a machine learning model to predict a particular encoding parameter value for streaming, in accordance with embodiments of the present disclosure.

Now referring to FIG. 5, each block of process 500, described herein, comprises a computing process that may be performed using any combination of hardware, firmware, and/or software. For instance, various functions may be carried out by a processor executing instructions stored in memory. The process may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system of FIG. 1. However, this method may additionally or alternatively be executed by any one system, or any combination of systems, including, but not limited to, those described herein. FIG. 5 is a flow diagram of an example process 500 for training a machine learning model to predict a particular encoding parameter value for streaming, according to some embodiments. In one or more embodiments, the process 500 represents or includes the functionality described with respect to the training system 100 of FIG. 1, or training as described with respect to FIG. 3.

Per block B502, one or more embodiments transmit data to cause an encoder to use a first value of an encoding parameter to convert first video data into first encoded video data. Examples of this are described with respect to the video encoder 103, where the server(s) 104 first instructs the video encoder 103 to convert the training video content (the first video data) into encoded video data at the particular encoding parameter value(s). In one or more embodiments, the streaming device(s) 704 or the secondary device(s) 706 of FIG. 7A or 7B performs block B502. In one or more embodiments, the receiver 109 of FIG. 1 performs block B502. In one more embodiments, the video encoder 103 itself performs block B508.

In one or more embodiments, the encoding parameter at block B502 defines a target bitrate (or any bitrate) for the video encoder. In one or more embodiments, the encoding parameter comprises an error correction parameter (e.g., FEC) for the encoder. In one or more embodiments, the encoding parameter alternatively or additionally includes other encoding parameters, such as intra-refresh, resolution, packet pacing, or another other encoding parameter described herein. In one or more embodiments, the encoder is implemented using a hardware accelerator, as described, for example, with respect to the video encoder 103 of FIG. 1.

In one or more embodiments, the first video data includes one or more categories of content, such as a scene change, a static scene, a low motion scene; or a high motion scene, as described herein. One or more embodiments identify the first video data for the instructing the video encoder based at least in part on the video data corresponding to one or more of these categories. For example, as described with respect to the MLM(s) 107 of FIG. 1, one or more embodiments can detect or predict that a current scene is a static scene (e.g., a pause menu screen) and responsively encode the static scene at a lower bitrate since the quality may not be as crucial relative to high motion scenes.

Per block B504, one or more embodiments (e.g., the server(s) 104) receive feedback associated with a receipt, using a network client (e.g., the content server 205 or the sender 105), of a stream comprising the first encoded video data (e.g., receiving a stream of the first encoded video data). For example, one or more embodiments can first receive a stream of the first encoded video data and then responsively generate network condition and/or encoding statistics. Examples of block B504 is described with respect to the receiver 109 generating the feedback and sending it for use by the MLM(s) 107. In one or more embodiments, block B504 is performed by the secondary device(s) 706 of FIG. 7A, the streaming devices(s) 704, and/or the MLM(s) 107 of FIG. 1. One or more embodiments generate the feedback based at least in part on simulating the network processing the stream of the first encoded video data. Examples of this are described with respect to simulated network referred to in FIG. 1.

In one or more embodiments, the feedback is based at least on one or more of: a bitrate of the encoded video, a quantity of dropped frames of the encoded video, packet loss, stutter, network bandwidth, macroblock count of the encoded video, packet arrival time, video quality, network latency, and/or an encoded bitrate to target bitrate ratio (e.g., the delta value difference between corresponding values). The feedback can additionally or alternatively include any other suitable feedback described herein.

Per block B506, one or more embodiments use (e.g., train) a machine learning model (MLM) to use data corresponding to the feedback to predict a second value of the encoding parameter. For example, at training time or inference time post MLM deployment, such "data" (e.g., a particular quantity of dropped frames) can be used as input to predict that the next or future video data should be encoded at a particular bitrate value (the second value). Examples of block B506 are described with respect to training the MLM(s) 107 of FIG. 1 and processing the training data input(s) 315 of FIG. 3. In one or more embodiments, the training at block B506 includes rewarding the MLM using reinforcement learning based at least in part on an encoded bitrate for the first encoded video data. The training can further include penalizing the MLM using reinforcement learning based at least in part on a quantity of frames dropped in the stream. Examples of this are described with respect to the "reward" and "penalty" functionality described with respect to the MLM(s) 107 of FIG. 1. In one or more embodiments, block B506 is performed by the secondary device(s) 706 of FIG. 7A, the streaming device(s) 704, and/or the MLM(s) 107 of FIG. 1.

With respect to training at block B506, one or more embodiments model real world scenarios with actual video data in a deep learning (DL) QoS network. Specifically, various embodiments simulate video data corresponding to different content categories/types of different games. Such categories can be or include static scenes with zero/minimal motion (e.g., menu screens, logo shots), long durational static scenes, high motion scenes with large translational motion, scene changes, and/or normal motion (e.g., motion dynamics between high motion and low motion scenes). In one or more embodiments, input video frames from these or other games are encoded with a video encoder at a particular bitrate (or other encoding parameter), which is used to determine, for example, packet losses in a simulated game stream environment. With such a wide variety of input video data indicating these different categories and games, one or more MLMs learn the optimal or target encoder parameter values to encode these different categories or instances of content at.

Per block B508, one or more embodiments transmit data to cause the encoder to use the second value of the encoding parameter to convert second video data into second encoded video data. Examples of this are described with respect to the video encoder 103, where the server(s) 104 instructs the video encoder 103 to first covert second training video content (second video data) into encoded video data using the video encoder target parameter value (the second value). In one or more embodiments, the streaming device(s) 704 or the secondary device(s) 706 of FIG. 7A or 7B performs block B502. In one or more embodiments, the receiver 109 of FIG. 1 performs block B502. In one more embodiments, the video encoder 103 itself performs block B508.

Per block B510, one or more embodiments stream the second encoded video data over a network channel (e.g., a simulated network channel, a 2.4 GHz frequency band, or 5 GHz frequency band) associated with the network. In one or more embodiments, such streaming occurs in response to the converting, by the video encoder, encoding the second video data into second encoded video data using the second value per B508. In other words, the streaming of the second encoded data is based on learning which target parameter value to incorporate for streaming the data. In one or more embodiments, block B510 is performed by the sender 105 of FIG. 1, and/or the streaming device(s) 704 of FIG. 7A/7B.

Figure 6:
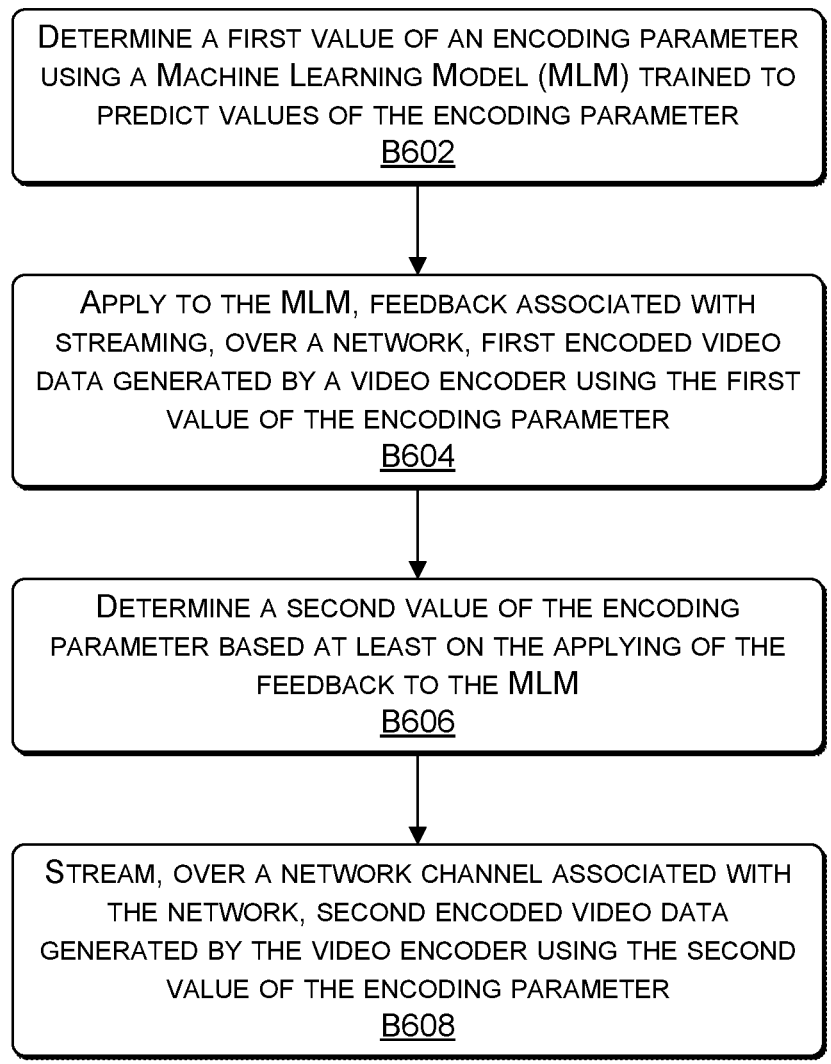
FIG. 6 is a flow diagram of an example process for determining a value of an encoding parameter based at least in part on applying feedback to a machine learning model, in accordance with embodiments of the present disclosure.

FIG. 6 is a flow diagram of an example process 600 for determining a value of an encoding parameter based at least in part on applying feedback to a machine learning model, according to some embodiments. In one or more embodiments, the process 600 represents the functionality performed by the system 200 of FIG. 2. In one or more embodiments, a system performs the process 600, where the system includes at least one of: a control system for a fully or semi-autonomous machine, a perception system for a fully or semi-autonomous machine, a system for performing simulation operations; a system for performing deep learning operations, a system implemented using an edge device, a system implemented using a robot, a system incorporating one or more virtual machines (VMs) or containers, a system implanted at least partially in a data center, or a system implemented at least partially using cloud computing resources.

Per block B602, one or more embodiments determine a first value of an encoding parameter using a machine learning model (MLM) trained to predict values of the encoding parameter. Examples of block B602 are described with respect to the MLM(s) 107 of FIG. 2 and processing the runtime input(s) 303 of FIG. 3. In one or more embodiments, the secondary device(s) 706 of FIG. 7A, the streaming device(s) 704 of FIGS. 7A/7B, and/or the MLM(s) 107 of FIG. 2 perform block B602.

In one or more embodiments, the encoding parameter defines a target bitrate (or encoded bitrate) for the video encoder. In one or more embodiments, the encoding parameter comprises an error correction parameter (e.g., FEC) for the video encoder. In one or more embodiments, the video encoder is executed using hardware acceleration, as described herein. In one or more embodiments, the MLM has been previously trained based on rewarding the MLM using reinforcement learning based at least in part on an encoded bitrate of the first encoded video data. In one or more embodiments, the training include penalizing the MLM using reinforcement learning based at least in part on a quantity of frames dropped in the stream, as described, for example, with respect to the MLM(s) 107 of FIG. 1.

Per block B604, one or more embodiments apply, to the MLM, feedback associated with streaming, first encoded video data generated by a video encoder using the first value of the encoding parameter. Examples of block B604 are described with respect to FIG. 2 where the MLM(s) 107 applies, or uses as input, the feedback received from the client 209, and where the content server 205 has streamed, over the network(s) 206, the video content (the first encoded video data) generated by the video encoder 203 using the value X (the first value) of the encoding parameter. In one or more embodiments, the MLM(s) 107, the secondary device(s) 706, and/or the streaming device(s) 704 of FIG. 7A/7B perform block B604.

In one or more embodiments, such first encoded video data that is streamed is a game of a game session hosted on a game server and to be played by one or more players using one or more client devices. In one or more embodiments, game content for this session can be streamed over a network channel to a client device, where different network channels may be used for different devices. In one or more embodiments, this feedback is placed into an asynchronous buffer or queue (e.g., the buffer 730 of the client device(s) 730). In one or more embodiments, this feedback is accessed or read from this buffer at an appropriate time and provided as input to a machine learning model (e.g., the MLM(s) 107), as described herein and with respect to block B606.

Per block B606, one or more embodiments determine a second value of the encoding parameter based at least in part on the applying of the feedback to the MLM. Examples of block B606 are described where the MLM(s) 107 of FIG. 2 determines the target encoding parameter value Y (the second value) based on applying the feedback from the client 209. In one or more embodiments, the MLM(s) 107 of FIG. 2, the secondary device(s) 706, and/or the streaming device(s) 704 perform block B606. In one or more embodiments, the second value corresponds to adjustments made for additional game content to be streamed over this network channel. In alternative embodiments, the second value is the same as the first value, which corresponds to maintaining current encoding parameter values.

Per block B608, one or more embodiments stream, over a network channel associated with the network, second encoded video data generated by the video encoder using the second value of the encoding parameter. Examples of block B608 are described with respect to FIG. 2, where the content server 205 streams, over the one or more networks 206, the video content streamed at encoding parameter value Y (as determined by the MLM(s) 107). In one or more embodiments, block B608 is performed by the streaming device(s) 704 of FIGS. 7A and/or 7B. Accordingly, for example, additional content for this session can then be streamed over this network channel using these adjusted (or maintained) network parameters. In one or more embodiments, this process 600 can continue for content sent on at least this session over at least this network channel.

Figure 7A:
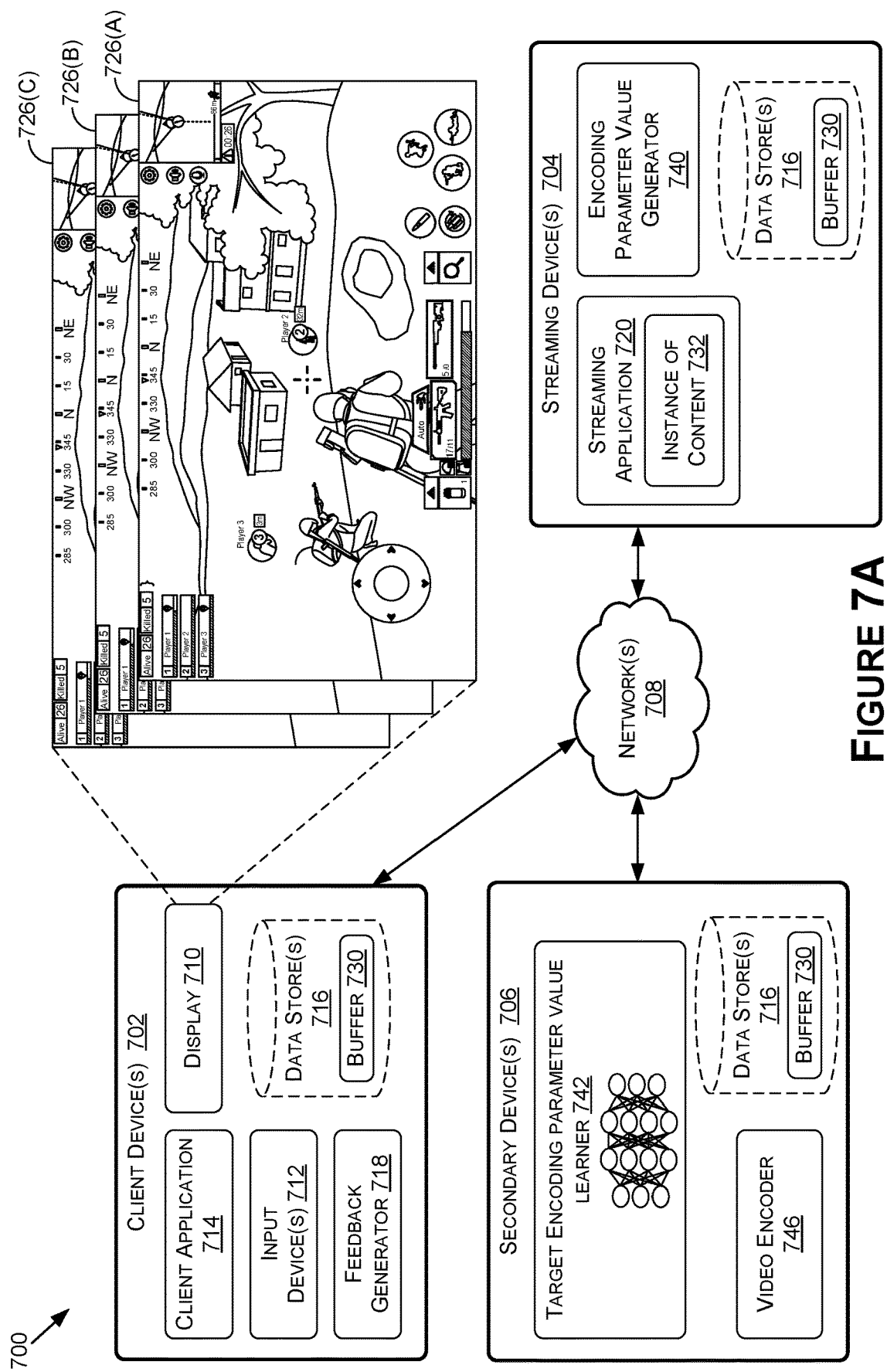
FIG. 7A is an example block diagram of a streaming system that encodes video data based on determined encoding parameters, in accordance with some embodiments of the present disclosure.

Now referring to FIG. 7A, FIG. 7A is an example block diagram of a streaming system 700 (e.g., for a cloud gaming environment) that encodes video data based on determined encoding parameters, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 700 may include, among other things, one or more client device(s) 702, one or more streaming device(s) 704, one or more secondary device(s) 706, and/or one or more network(s) 708. The system 700 (and the components and/or features thereof) may be implemented using one or more computing device(s), such as the computing device 900 of FIG. 9, described in more detail herein.

Each of the devices or components of the system 700 may communicate between and among one another using the network(s) 708. The network(s) 108 may include a wide area network (WAN) (e.g., the Internet, a public switched telephone network (PSTN), etc.), a local area network (LAN) (e.g., Wi-Fi, Ethernet, etc.), a simulated network, and/or another network type.

In one or more embodiments, the client device(s) 702 represent or includes the functionality as described with respect to the receiver 109 of FIG. 1 and/or the client device(s) 209 of FIG. 2. The client device(s) 702 may include a smart phone, a laptop computer, a tablet computer, a desktop computer, a wearable device, a game console, a virtual reality system (e.g., a headset, a computer, a game console, remote(s), controller(s), and/or other components), a streaming device (e.g., an NVIDIA SHIELD), a smart-home device that may include an intelligent personal assistant, and/or another type of device capable of supporting at least display of a game stream of content (e.g., game) sessions 726 and/or inputs to the content sessions 726 from an input device(s) 712. In one or more embodiments, each of the content session instances—726(A), 726(B), and 726(C)—represent individual video frames corresponding to particular scene types described herein, such as high motion scenes, low motion scenes, scene changes, and the like.

The client device(s) 702 may include a display 710, one or more input device(s) 712, a client application 714, one or more data store(s) 716, and/or at least some of the functionality of a feedback generator 718. In some examples, at least some of the functionality of the feedback generator 118 may be executed within the client application 714. Although certain components and/or features of the client device(s) 702 are illustrated in FIG. 7A, this is not intended to be limiting. For example, the client device(s) 702 may have additional or alternative components, such as, without limitation, those described herein with respect to the computing device 900 of FIG. 9. The features and functionality of the client device(s) 702 may be described in more detail herein with respect to FIG. 7B and FIG. 8.

The client application 714 may be a mobile application, a computer application, a console application, a game application, and/or another type of application. The client application 714 may include instructions that, when executed by a processor(s) of the client device(s) 702, cause the processor(s) to perform one or more operations (such as but not limited to the operations described herein with respect to the receiver 109 of FIG. 1 or the client 209 of FIG. 2). The client application 714 may operate as a facilitator for enabling gameplay of an instance of a game. For example, the client application 714 may, without limitation, display a game stream received from the streaming device(s) 704, receive and/or process inputs from one or more of the input device(s) 712 of the client device(s) 102, and/or cause transmission of input data representative of the inputs to the streaming device(s) 704. In some examples, as described herein, the client application 714 may include some of the features or functionality of the feedback generator 718, as described by the "feedback" provided by the receiver 109 or client application 209. The feedback generator 718 is generally responsible for generating and transmitting (e.g., to the streaming device(s) 704) feedback (e.g., current frame bandwidth, current bitrate, frames dropped), as described herein. In one or more embodiments, the client device(s) 702 may include any number of client application 714 where features and functionality of the system 700 are distributed.

The client device(s) 702 may include one or more components (e.g., a communication component, network interface, etc.) and features for communicating across one or more networks, such as the network(s) 708. As a non-limiting example, to communicate within the system 700, the client device(s) 702 may use a wired Ethernet connection and/or Wi-Fi connection through a router to access the Internet in order to communicate with the streaming device(s) 704, the secondary device(s) 706, and/or with other client device(s) 702.

The display 710 may include any type of display capable of displaying the video content (e.g., a light-emitting diode display (LED), an organic LED display (OLED), a liquid crystal display (LCD), an active matrix OLED display (AMOLED), a quantum dot display (QDD), a plasma display, and/or another type of display). In some examples, depending on the configuration of the client device(s) 702, the display 710 may include more than one display (e.g., a dual-monitor display for computer gaming, a first display for configuring a game and a virtual reality display for playing the game, etc.). Where the display 710 is a touch-screen display, such as a touch-screen of a smart phone, tablet computer, laptop computer, and/or the like, the display 710 may be used as at least one of the input device(s) 712 of the client device(s) 702 (e.g., one of the input device(s) 712 for generating inputs to an instance of the content 732 (e.g., a video frame) for transmission to the streaming device(s) 704 for updating the rendering of the content). The display 710 may display the content stream (e.g., a game stream) of one or more content sessions, such as sessions 726(A), content sessions 726(B), and/or content sessions 726(C) (referred to collectively herein as "content sessions 726"). The content sessions 726 may include any number of content sessions participated in by the user of the client device(s) 702.

The input device(s) 712 may include any type of devices that are capable of providing user inputs to the game. The input device(s) 712 may include a keyboard, a mouse, a joystick, a touch-screen display, a controller(s), a remote(s), a headset (e.g., sensors of a virtual reality headset), another type of input device, and/or a combination thereof.

The data store(s) 716 may include any memory device types. The data store(s) 716 may store some or all of the content stream in embodiments where the client device(s) 702 may be tasked with storage and/or generation of feedback via the feedback generator 718. For example, the data store(s) 716 may store an entire game stream, bitrate, bandwidth, quantity of frames dropped, and the like.

In some examples, the data store(s) 716 may only store a portion of the content stream. For example, the data store(s) 716 may only store the snapshots, certain data frames, or scenes (e.g., high motions scenes, low motion scenes, or the like). A buffer 730 may be used to store a portion of the content stream, which may be copied or retrieved from the buffer (and separately stored in the data store(s) 716). The buffer 730 may store only a portion of content stream or feedback (e.g., the most recent thirty seconds of a game stream may be stored in the buffer 730). As such, when a content stream or feedback may be generated, at least some of the portion in the buffer 730, in addition to, in some examples, a next portion of the content stream (e.g., the next ten seconds) may be copied or retrieved in order to generate video content or feedback. The buffer 730 may include a cyclic or rolling buffer, in some non-limiting examples.

In one or more embodiments, the streaming device(s) 704 represent or include the functionality as described with respect to the sender 105 of FIG. 1 and/or the content server 205 of FIG. 2. The streaming device(s) 704 may include a streaming application 720 for receiving input data representative of inputs to the client device(s) 702, rendering an instance of a content 732, encoding (e.g., via the video encoder 746) the instance of the content 732 in a stream, and transmitting the stream to the client device(s) 702. In some examples, as described herein, the streaming application 720 may include some of the features or functionality of the feedback generator 718 (e.g., where the client device(s) 702 have limited processing). In addition, in some examples, the streaming application 720 may receive the feedback, over the network(s) 708 from the feedback generator 718 to set the encoding parameter value via the encoding parameter value generator 740. In one or more embodiments, the streaming device(s) 704 may include any number of streaming application 720 where features and functionality of the system 700 are distributed.

The encoding parameter value generator 740 is generally responsible for determining or identifying the particular encoding parameter value to stream content at, such as streaming the instance of content 132 (e.g., at a particular bitrate value). In one or more embodiments, such determination or identifying is based on receiving a message (e.g., a control signal) from the secondary device(s) 706 (e.g., the encoding parameter target value adjuster 744), as described in more detail herein.

In one or more embodiments, the streaming device(s) 704 may render an instance of the content 732, and communicate the content stream to two or more device(s) as a plurality of instances of the content. In these embodiments, the two or more instances of the content may be copies of the rendered instance of the content. In these embodiments, sending two instances of the content via network(s) 08 may be advantageous to simultaneously display the instance of the content at a client device(s) 702 and/or capture at least a portion of the game stream at a secondary device(s) 706.

The streaming device(s) 704 may include one or more components (e.g., a communication component, network interface, etc.) and features for communicating across one or more networks, such as the network(s) 708. As a non-limiting example, to communicate within the system 700, the streaming device(s) 704 may transmit and receive data across the Internet in order to communicate with the secondary device(s) 706, the client device(s) 702, and/or other streaming device(s) 704.

The streaming device(s) 704 may include the data store(s) 716, similar to the data store(s) 716 of the client device(s) 702 and/or the secondary device(s) 706, described herein. For example, depending on the distribution of the tasks of the feedback generator 718, the streaming device(s) 704 may be tasked with generating, storing, and/or sharing feedback and/or content associated with the content stream.

The secondary device(s) 706 include the target encoding parameter value learning 742, the video encoder 746, and the data store(s) 716. In one or more embodiments, the target encoding parameter value learner 742 represents or includes the functionality as described with respect to the MLM(s) 107 of FIG. 1 or FIG. 2, the neural network 305 of FIG. 3, and/or the machine learning model architecture 400 of FIG. 4. In one or more embodiments, the video encoder 746 includes represents the functionality as described with respect to the video encoder 103 of FIG. 1 and/or the video encoder 203 of FIG. 2.

In one or more embodiments, the secondary device(s) 706 includes third party services or devices for recording and/or live streaming the content stream. In one or more embodiments, the secondary device(s) 706 may be stream viewing devices configured to receive and transmit at least a portion of the content stream to a plurality of viewing devices. For example, in one or more embodiments, the secondary device(s) 706 may receive a game stream from the streaming device(s) 704 and redistribute the game stream to a plurality of viewers (e.g., "live streaming"). In one or more embodiments, similar to other embodiments disclosed herein, streaming to a secondary device(s) 706 such as third party services or devices may reduce processing resources and network resources for a client device(s) 702 as compared to conventional game streaming systems.

In an illustrative example of how the system 700 can function in light of the secondary device(s) 707, at a first time, the video encoder 746 can encode first video content, a first set (i.e., one or more) of video frames, using parameter value A (e.g., a first bitrate), and responsively buffer this information into buffer 730 as well as send, over the one or more networks 708, the first set of video frames at parameter value A to the streaming device(s) 704. Responsively, the streaming device(s) buffers, in the buffer 730, the first set of video frames and streams, via the streaming application 720, the first set of video frames as the instance of content 732, over the one or more networks(s) 708, to the client device(s) 702. The client device(s) 702 then buffers, via the buffer 730, the first set of video frames and causes display of the first set of video frames (e.g., 726) via the display 710. In parallel or shortly after such display, the feedback generator 718 generates feedback associated with the network or encoding parameter value A (e.g., actual encoded bitrate value, available bandwidth, quantity of dropped frames, etc.).

Continuing with this example, responsively, the client device(s) 702 buffers, via the buffer 730, the feedback and transmits, over the one or more networks 708, the feedback to the secondary device(s) 706, where the target encoding parameter value learner 742 uses the feedback as input to predict a target parameter value for a second set of video frames (e.g., that is sequentially ordered after the first set of video frames). The target encoding parameter value learner 742 determines a target parameter value B to apply to the second set of frames using the feedback as input. Accordingly, one of the secondary device(s) 706 or the target encoding parameter value learner 742 responsively instructs the video encoder 746 to encode the second set of video frames using the target parameter value B (e.g., a modified bitrate). This single pass process is then repeated, as described above (i.e., the second set of video frames at target parameter value B are passed, via the network(s) 708, to the streaming device(s) 704, which are then passed, via the network(s) 708, to the client device(s) 702, which then generates more feedback, via the feedback generator 718, which is then passed back to the target encoding parameter value learner 742, where, for example, the encoding parameter target value B can yet again be adjusted based on the most recent feedback).

The secondary device(s) 706 may include one or more components (e.g., a communication component, network interface, etc.) and features for communicating across one or more networks, such as the network(s) 708. As a non-limiting example, to communicate within the system 700, the secondary device(s) 704 may transmit and receive data across the Internet in order to communicate with the streaming device(s) 704, the client device(s) 702, and/or other secondary device(s) 706.

Figure 7B:
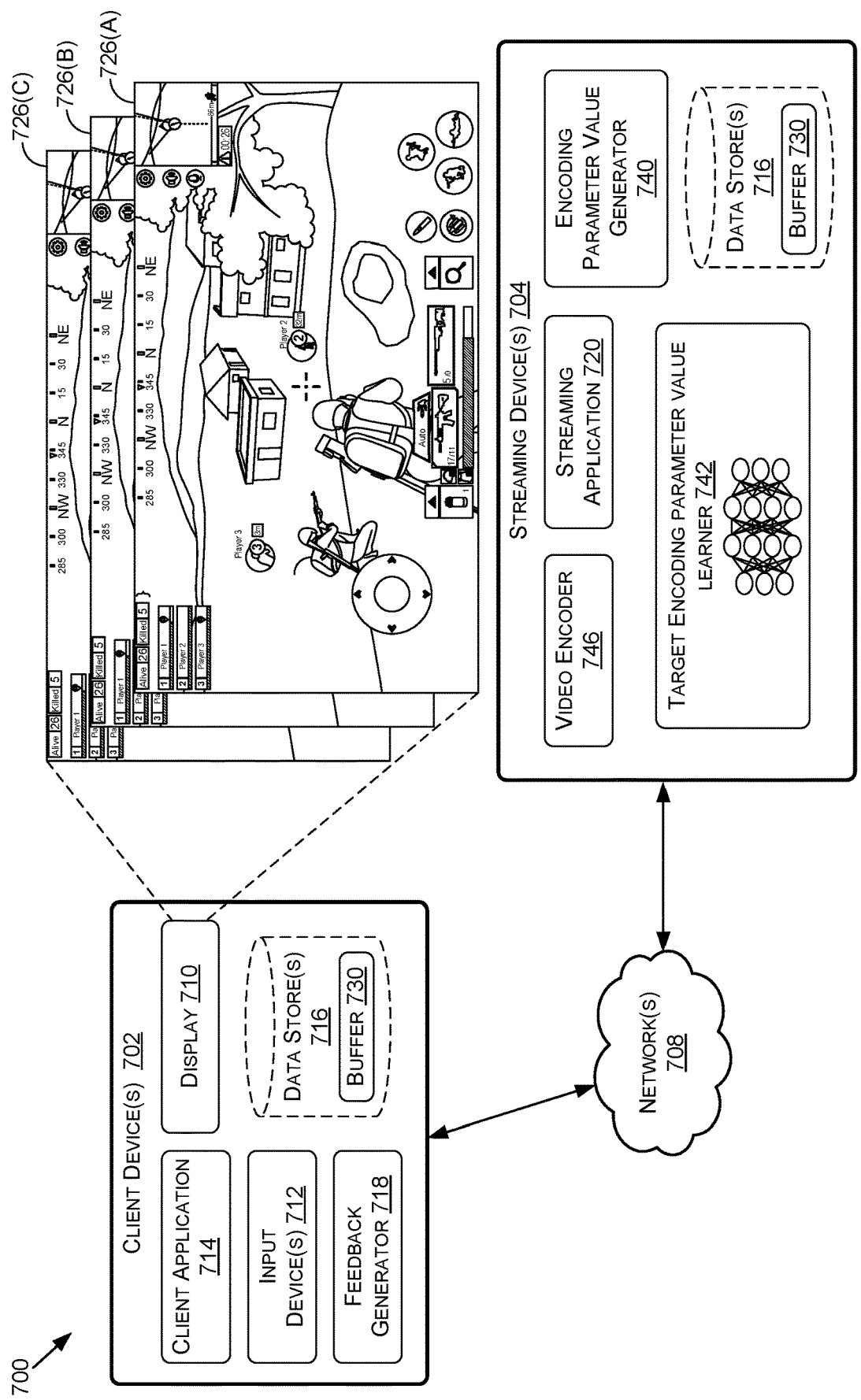
FIG. 7B is an example block diagram of a streaming system that encodes video data based on determined encoding parameters, in accordance with some embodiments of the present disclosure.

Now referring to FIG. 7B, FIG. 7B is an example block diagram of a streaming system 700-1 (e.g., for a cloud gaming environment) that encodes video data based on determined encoding parameters, in accordance with some embodiments of the present disclosure. The system 700-1 of FIG. 7B illustrates an alternative embodiment relative to the system 700 of FIG. 7A. Specifically, the system 700-1 does not include any secondary device(s) 706. Rather, the functionality and modules described with respect to the secondary device(s) 706 of the system 700 can be included in the streaming device(s) 704, as illustrated in FIG. 7B. Specifically, the streaming device(s) 704 can alternatively include the video encoder 746, the streaming application 720, the target encoding parameter value learner 742, and the encoding parameter value generator 740. Each component of the system 700-1 includes identical functionality as described by the corresponding component of the system 700 of FIG. 7A.

In an illustrative example of how the system 700-1 can function, at a first time, the video encoder 746 can encode first video content, a first set (i.e., one or more) of video frames, using parameter value A (e.g., a first bitrate), and responsively instruct the streaming application 720 to stream the first set of video frames as the instance of content 732, over the one or more networks(s) 708, to the client device(s) 702. The client device(s) 702 then buffers, via the buffer 730, the first set of video frames and causes display of the first set of video frames (e.g., 726) via the display 710. In parallel or shortly after such display, the feedback generator 718 generates feedback associated with the network or encoding parameter value A (e.g., actual encoded bitrate value, available bandwidth, quantity of dropped frames, etc.).

Continuing with this example, responsively, the client device(s) 702 buffers, via the buffer 730, the feedback and transmits, over the one or more networks 708, the feedback to the streaming device(s) 704, where the target encoding parameter value learner 742 uses the feedback as input to predict a target parameter value for a second set of video frames (e.g., that is sequentially ordered after the first set of video frames). The target encoding parameter value learner 742 determines a target parameter value B to apply to the second set of frames using the feedback as input. Accordingly, the target encoding parameter value learner 742 responsively instructs the video encoder 746 to encode the second set of video frames using the target parameter value B (e.g., a modified bitrate). This single pass process is then repeated, as described above (i.e., the second set of video frames at target parameter value B are passed, via the network(s) 708, to the client device(s) 702, which then generates more feedback, via the feedback generator 718, which is then passed back to the target encoding parameter value learner 742, where, for example, the encoding parameter target value B can yet again be adjusted based on the most recent feedback).

Figure 8:
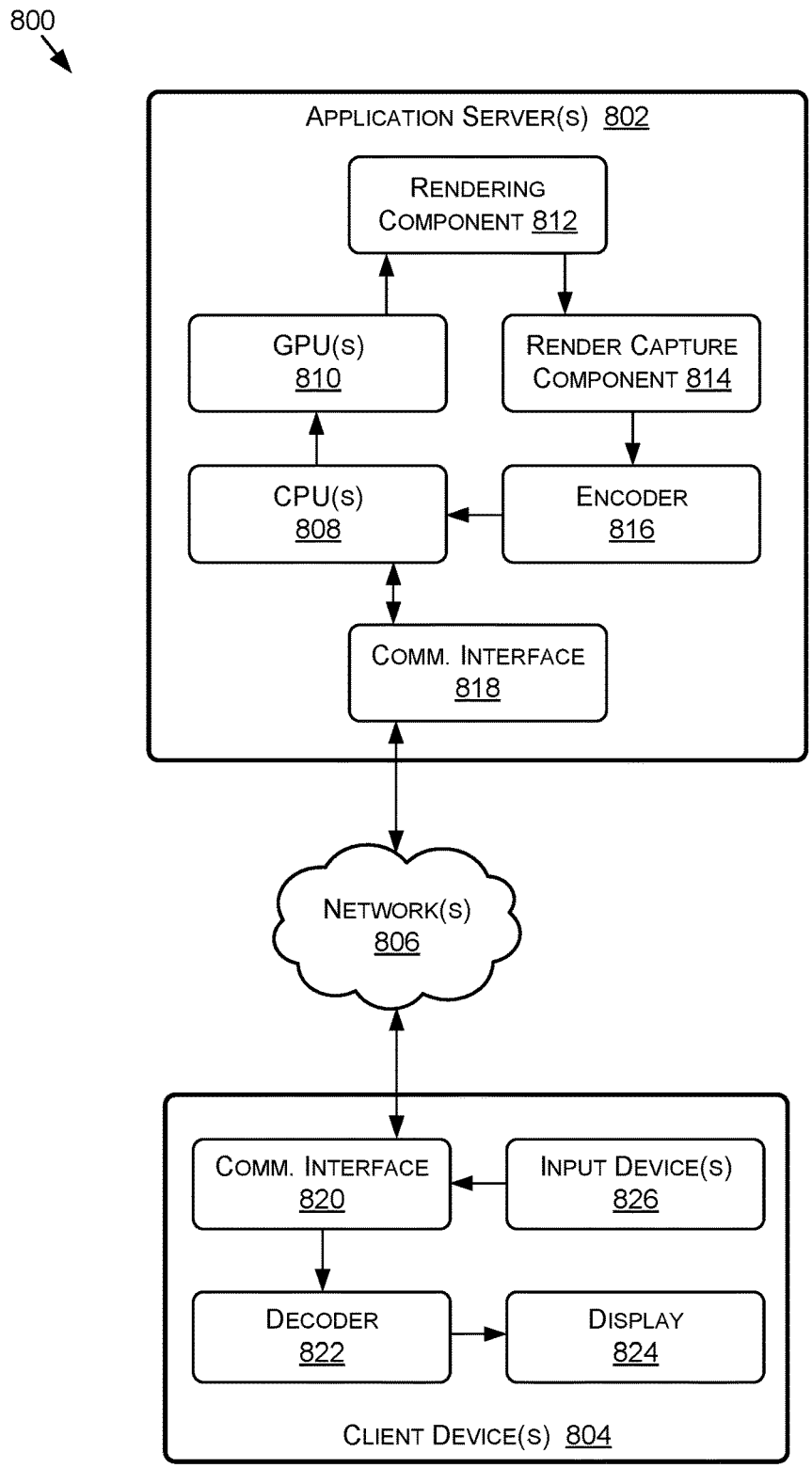
FIG. 8 is a block diagram of an example content streaming system suitable for use in implementing some embodiments of the present disclosure.

Now referring to FIG. 8, FIG. 8 is an example system diagram for a content streaming system 800, in accordance with some embodiments of the present disclosure. In one or more embodiments, the application server(s) 802 includes the functionality as described with respect to the content server 205 of FIG. 2, the sender 105 of FIG. 1, secondary device(s) 706 and/or streaming device(s) 704 of FIGS. 7A and 7B. In one or more embodiments, the client device(s) 804 represents or includes the functionality as described with respect to the client device(s) 702 of FIG. 7A, 7B, or any other client device described herein. FIG. 8 includes application server(s) 802 (which may include similar components, features, and/or functionality to the example computing device 900 of FIG. 9), client device(s) 804 (which may include similar components, features, and/or functionality to the example computing device 900 of FIG. 9), and network(s) 806 (which may be similar to the network(s) described herein). In some embodiments of the present disclosure, the system 800 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 800, for an application session, the client device(s) 804 may only receive input data in response to inputs to the input device(s), transmit the input data to the application server(s) 802, receive encoded display data from the application server(s) 802, and display the display data on the display 824. As such, the more computationally intense computing and processing is offloaded to the application server(s) 802 (e.g., rendering—in particular ray or path tracing—for graphical output of the application session is executed by the GPU(s) of the game server(s) 802). In other words, the application session is streamed to the client device(s) 804 from the application server(s) 802, thereby reducing the requirements of the client device(s) 804 for graphics processing and rendering.

For example, with respect to an instantiation of an application session, a client device 804 may be displaying a frame of the application session on the display 824 based on receiving the display data from the application server(s) 802. The client device 804 may receive an input to one of the input device(s) and generate input data in response. The client device 804 may transmit the input data to the application server(s) 802 via the communication interface 820 and over the network(s) 806 (e.g., the Internet), and the application server(s) 802 may receive the input data via the communication interface 818. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 812 may render the application session (e.g., representative of the result of the input data) and the render capture component 814 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 802. In some embodiments, one or more virtual machines (VMs)—e.g., including one or more virtual components, such as vGPUs, vCPUs, etc.—may be used by the application server(s) 802 to support the application sessions. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Figure 9:
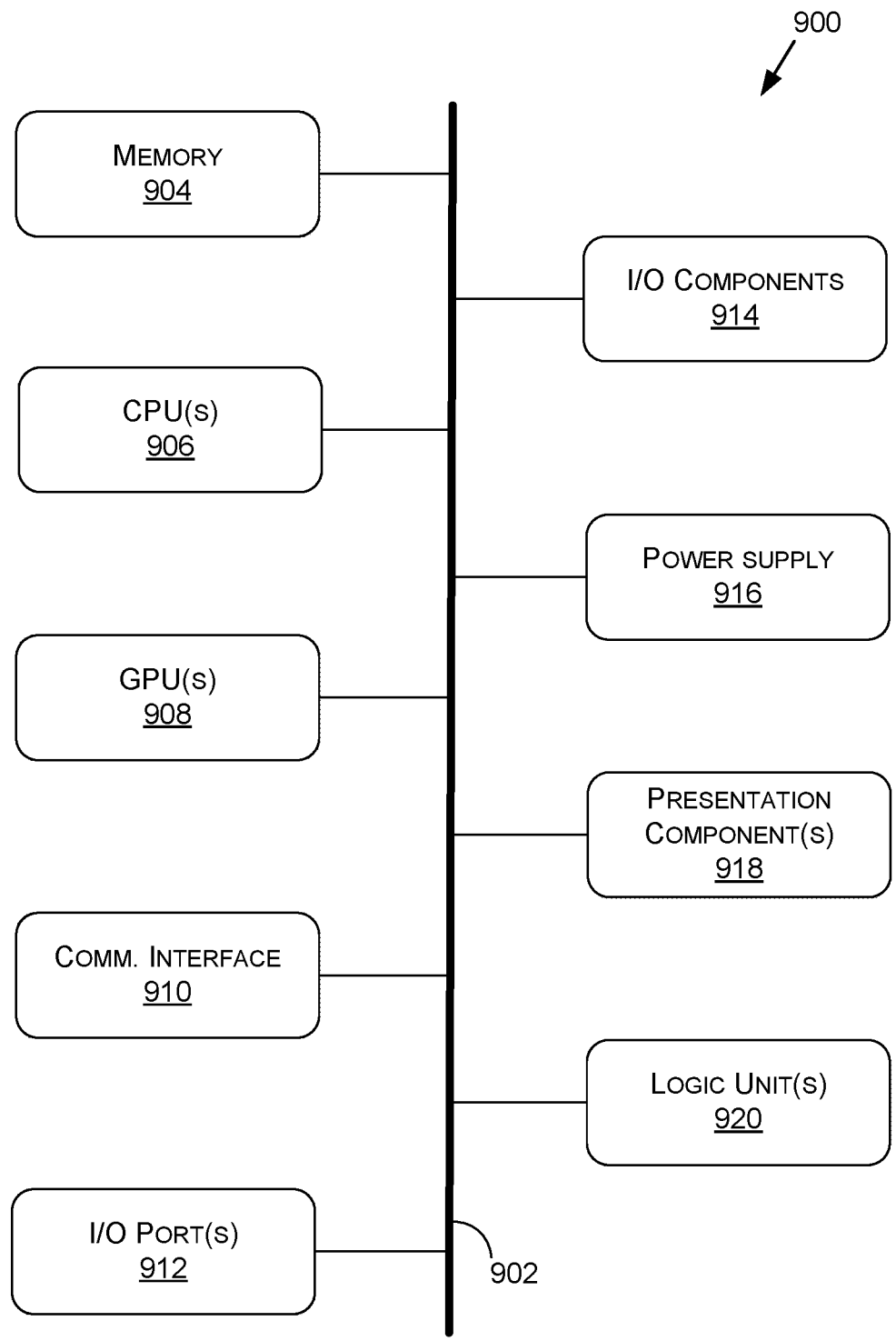
FIG. 9 is a block diagram of an example computing device(s) suitable for use in implementing some embodiments of the present disclosure.

FIG. 9 is a block diagram of an example computing device(s) 900 suitable for use in implementing some embodiments of the present disclosure. In one or more embodiments, the computing device(s) 900 represents any client device described herein (e.g., client device(s) 700), the secondary device(s) 706, the streaming device(s) 704, the content server 205, and/or the receiver 109. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof.

The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Figure 10:
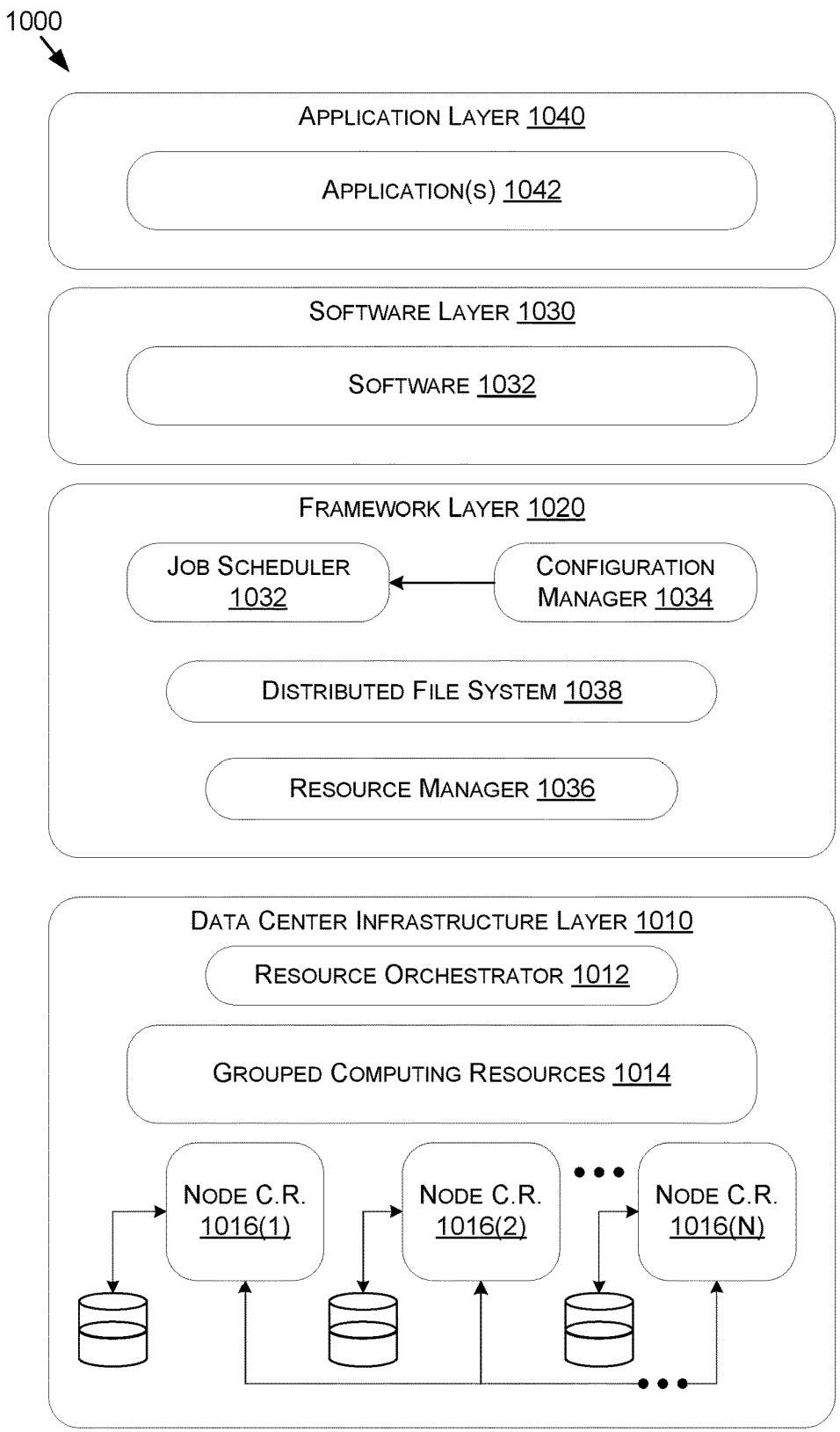
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040. In one or more embodiments, the data center infrastructure layer 1010 includes or represents the content server 205 of FIG. 2, the sender 105 of FIG. 1, secondary device(s) 706 and/or streaming device(s) 704 of FIGS. 7A and 7B.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

What is claimed is:

1. A method comprising:
transmitting data to cause an encoder to use at least one first value of at least one encoding parameter to convert first video data into first encoded video data;
receiving, using a network client, feedback associated with a receipt of a stream comprising the first encoded video data, the feedback corresponding to network performance associated with an encoded bitrate of the first encoded video data in the stream;
predicting, using a Machine Learning Model (MLM) and the feedback, at least one second value of the at least one encoding parameter representing a prediction of a target bitrate that penalizes a mismatch between the target bitrate and an actual bitrate of second encoded video data and accounts for one or more criteria corresponding to the network performance;
transmitting data to cause the encoder to use the at least one second value of the at least one encoding parameter predicted using the MLM to encode video data of the stream into the second encoded video data using the target bitrate; and
streaming the second encoded video data over a network channel associated with the network client.

2. The method of claim 1, wherein the prediction rewards a higher magnitude of the target bitrate.

3. The method of claim 1, wherein the MLM is trained to predict an error correction parameter for the encoder and the error correction parameter further uses the error correction parameter to convert second video data to the second encoded video data.

4. The method of claim 1, wherein the MLM is trained using, in reinforcement learning, a reward function that includes a reward that is to maximize encoded bitrates achieved using the encoder while using a penalty for the one or more criteria.

5. The method of claim 1, further comprising generating the feedback based at least on simulating a network processing the stream of the first encoded video data.

6. The method of claim 1, wherein the MLM is trained using reinforcement learning based at least on a reward function that includes a reward that increases based at least on increasing encoded bitrates of encoded video data generated using the encoder.

7. The method of claim 1, wherein the MLM is trained using reinforcement learning based at least on a reward function that includes a penalty that decreases a reward as a quantity of frames dropped in the stream increases.

8. The method of claim 1, wherein the MLM predicts the target bitrate based at least on an annotation of second video data that identifies a category of content including one or more of:

a scene change;
a static scene;
a low motion scene; or
a high motion scene.

9. The method of claim 1, wherein the network performance corresponds to one or more of:
a quantity of dropped frames of the first encoded video data;
packet loss;
stutter;
packet arrival time; or
network latency.

10. A system comprising:
one or more processing units to execute a method comprising:
determining at least one first value of at least one encoding parameter using a Machine Learning Model (MLM) trained to predict values of the at least one encoding parameter;
applying, to the MLM, feedback corresponding to network performance associated with streaming, over a network, first encoded video data generated by a video encoder using the at least one first value of the at least one encoding parameter;
determining at least one second value of the at least one encoding parameter based at least on the applying of the feedback to the MLM, the at least one second value representing a prediction of a target bitrate for the video encoder that penalizes a mismatch between the target bitrate an actual bitrate of second encoded video data and accounts for one or more criteria corresponding to the network performance; and
streaming, over a network channel associated with the network, the second encoded video data generated by the video encoder using the at least one second value of the at least one encoding parameter.

11. The system of claim 10, wherein the system is comprised in at least one of:
a control system for a fully or semi-autonomous machine;
a perception system for a fully or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

12. The system of claim 10, wherein the MLM is trained to minimize a difference between the target bitrate for the video encoder and the actual bitrate achieved using the video encoder.

13. The system of claim 10, wherein the at least one encoding parameter comprises an error correction parameter for the video encoder.

14. The system of claim 10, wherein the video encoder is implemented using a hardware accelerator.

15. The system of claim 10, wherein the MLM is trained based on rewarding the MLM for maximizing encoded bitrates achieved using the video encoder while accounting for the one or more criteria.

16. At least one processor, comprising:
one or more processing units to use a Machine Learning Model (MLM) to predict one or more first values of at least one encoding parameter that represent a target bitrate for a video encoder to be used to generate encoded video data based at least on applying, to the MLM, feedback corresponding to network performance associated with streaming portions of video data encoded by the video encoder using one or more second values of the at least one encoding parameter generated using the MLM,
wherein the MLM uses the feedback to predict the one or more first values while penalizing a mismatch between the target bitrate for the encoded video data and an actual bitrate of the encoded video data and accounting for one or more criteria corresponding to the network performance.

17. The at least one processor of claim 16, wherein the network performance corresponds to one or more of:
a quantity of dropped frames of the video data encoded by the video encoder;
packet loss;
stutter;
network bandwidth;
packet arrival time; or
network latency.

18. The at least one processor of claim 16, wherein the MLM is trained to minimize a difference between the target bitrate for the encoder and the actual bitrate.

19. The at least one processor of claim 16, wherein the at least one encoding parameter comprises an error correction parameter for the encoder.

20. The at least one processor of claim 16, wherein the MLM is trained based on rewarding the MLM for maximizing encoded bitrates achieved using the video encoder and penalizing the MLM for a quantity of dropped frames.

* * * * *